United States Patent [19]

Oswald et al.

[11] Patent Number: 4,600,069

[45] Date of Patent: Jul. 15, 1986

[54] TRAILING ARM SUSPENSION

[75] Inventors: Norman D. Oswald, Duncanville; Carl M. Franklin, Midlothian; Marc H. Gutzler, Duncanville; Harry S. Mankey, Dallas, all of Tex.

[73] Assignee: Standard Manufacturing Company, Inc., Dallas, Tex.

[21] Appl. No.: 609,887

[22] Filed: May 14, 1984

Related U.S. Application Data

[63] Continuation-in-part of Ser. No. 506,403, Jun. 21, 1983, which is a continuation-in-part of Ser. No. 426,218, Sep. 28, 1982, Pat. No. 4,454,925.

[51] Int. Cl.⁴ .............................................. B62D 61/10
[52] U.S. Cl. .................................. 180/24.02; 280/6 H
[58] Field of Search ................. 180/22, 24.02, 6.54, 180/9.1, 148; 280/6 H, 705

[56] References Cited

U.S. PATENT DOCUMENTS

| | | | |
|---|---|---|---|
| 1,836,446 | 12/1931 | Christie | 180/9.2 |
| 1,858,784 | 5/1932 | Masury | 180/72 |
| 1,902,712 | 3/1933 | Leipert | 180/24.11 |
| 1,938,498 | 12/1933 | Porcello | 180/22 |
| 1,938,847 | 12/1933 | Masury | 180/72 |
| 2,024,199 | 12/1935 | Barnes et al. | 180/72 |
| 2,044,306 | 6/1936 | Kegresse | 180/6.54 |
| 2,091,509 | 8/1937 | Kramer | 180/72 |
| 2,269,728 | 1/1942 | Mills | 280/104 |
| 2,299,006 | 10/1942 | Brown | 180/72 |
| 2,319,978 | 5/1943 | Collender | 180/72 |
| 2,899,064 | 6/1959 | Hudson | 180/148 |
| 3,105,700 | 10/1963 | Hardman | 280/685 |
| 3,165,331 | 1/1965 | Hardman et al. | 280/104 |
| 3,299,978 | 1/1967 | Sponsler | 180/24.02 |
| 3,304,097 | 2/1967 | Lewis | 280/676 |
| 3,372,766 | 3/1968 | Lifferth | 180/22 |
| 3,525,534 | 8/1970 | Madler et al. | 280/104 |
| 3,566,825 | 3/1971 | Ruf | 180/22 |
| 3,656,572 | 8/1972 | Mercier | 180/72 |
| 3,809,004 | 5/1974 | Leonheart | 180/22 |
| 3,930,550 | 1/1976 | Rose et al. | 280/705 |
| 4,056,158 | 11/1977 | Ross | 180/6.48 |
| 4,285,627 | 8/1981 | Oswald et al. | 414/695.5 |
| 4,310,173 | 1/1982 | Varady | 280/6 H |
| 4,315,631 | 2/1982 | Rainville | 280/6 H |
| 4,325,443 | 4/1982 | Fischer et al. | 180/22 |

FOREIGN PATENT DOCUMENTS

| | | | |
|---|---|---|---|
| 1308726 | 2/1963 | France | 280/104 |
| 169000 | 11/1965 | U.S.S.R. | 280/6 H |

Primary Examiner—John J. Love
Assistant Examiner—Ross Weaver
Attorney, Agent, or Firm—Michael A. O'Neil

[57] ABSTRACT

An undercarriage (12) includes a primary frame (22) and a plurality of secondary frames (26) which in turn carry wheel members (28). The secondary frames (26) are urged to pivot away from the primary frame (12) by spring mechanisms (38). An undercarriage (112) includes a primary frame (122) and a plurality of secondary frames (126) which in turn carry wheel members (128). Pivotal movement of the endmost secondary frames (126e) is controlled by spring/shock absorber assemblies (134). Pivotal movement of the center secondary frame (126c) is controlled by a spring/shock absorber/cylinder assembly (136). Spring/shock absorber/hydraulic cylinder assemblies (250) may be used to control the positioning of all of the wheels of an undercarriage (422, 452, etc.).

18 Claims, 62 Drawing Figures

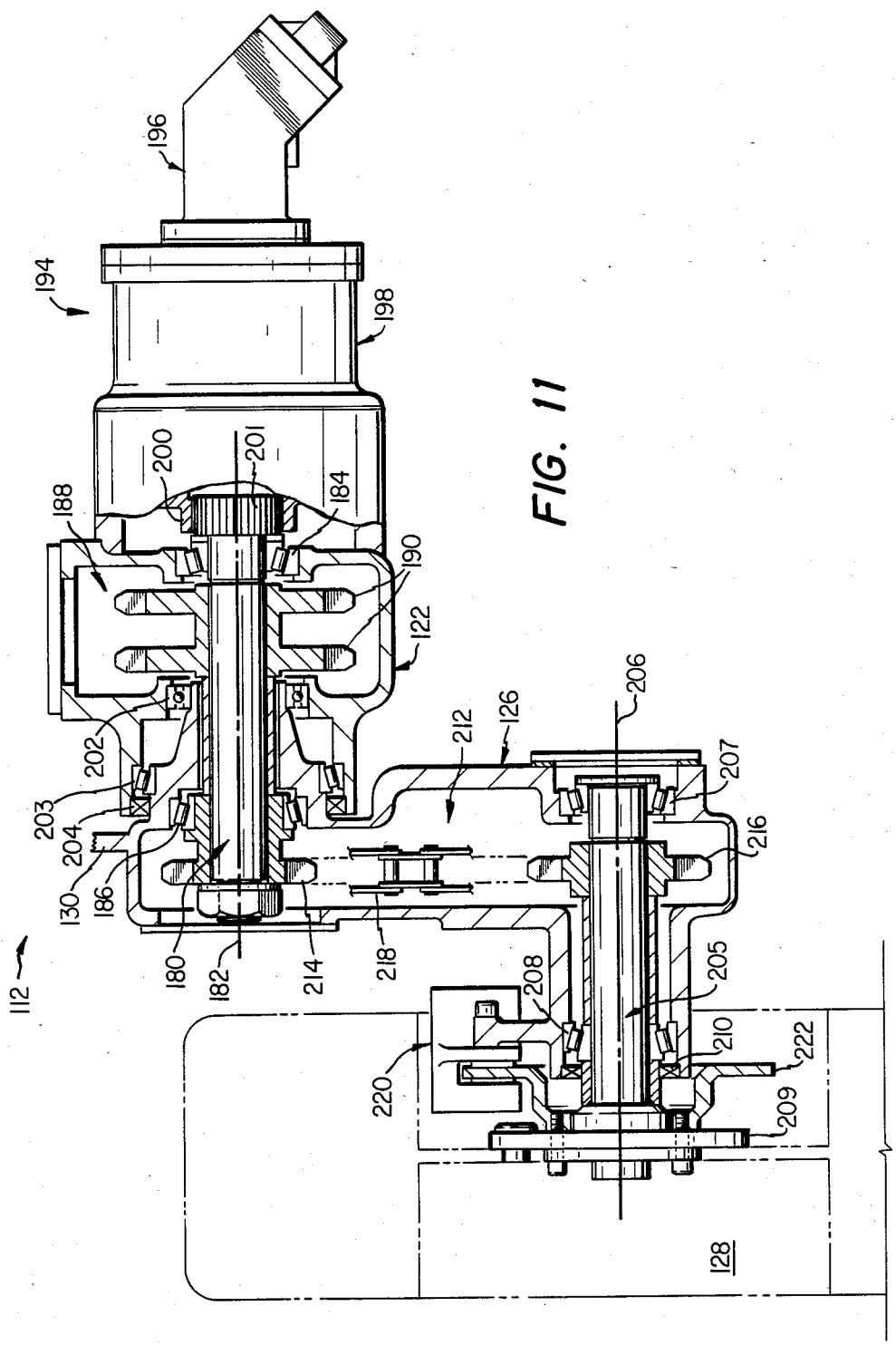

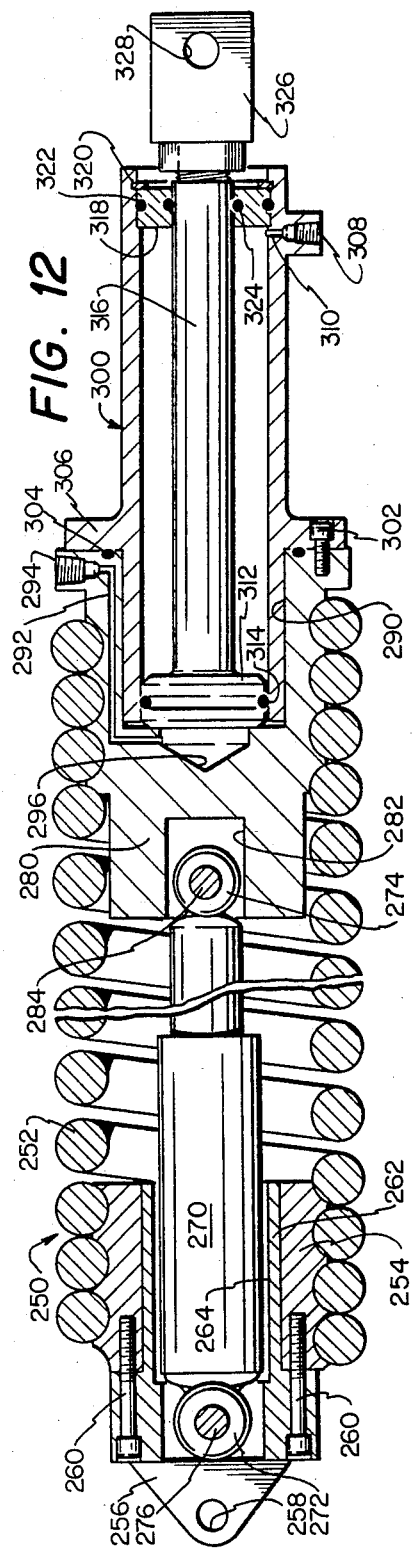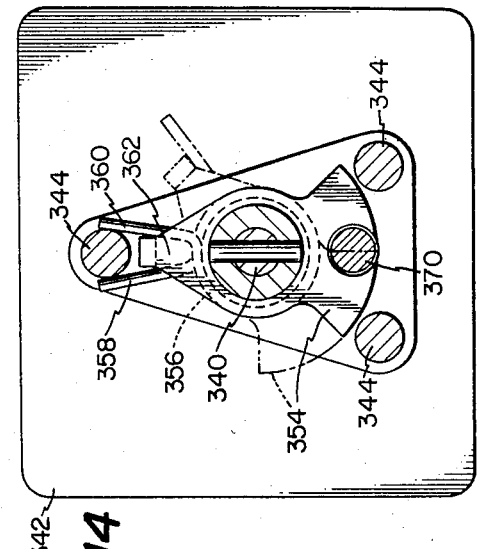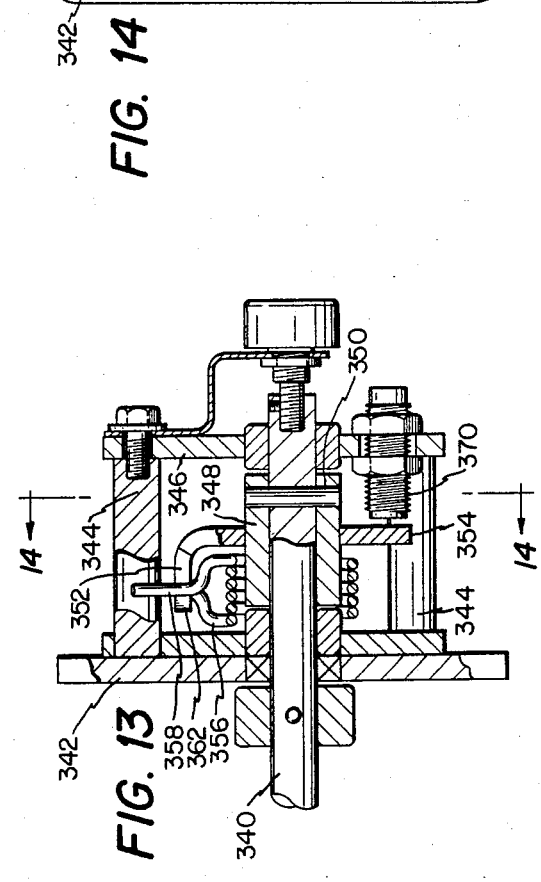

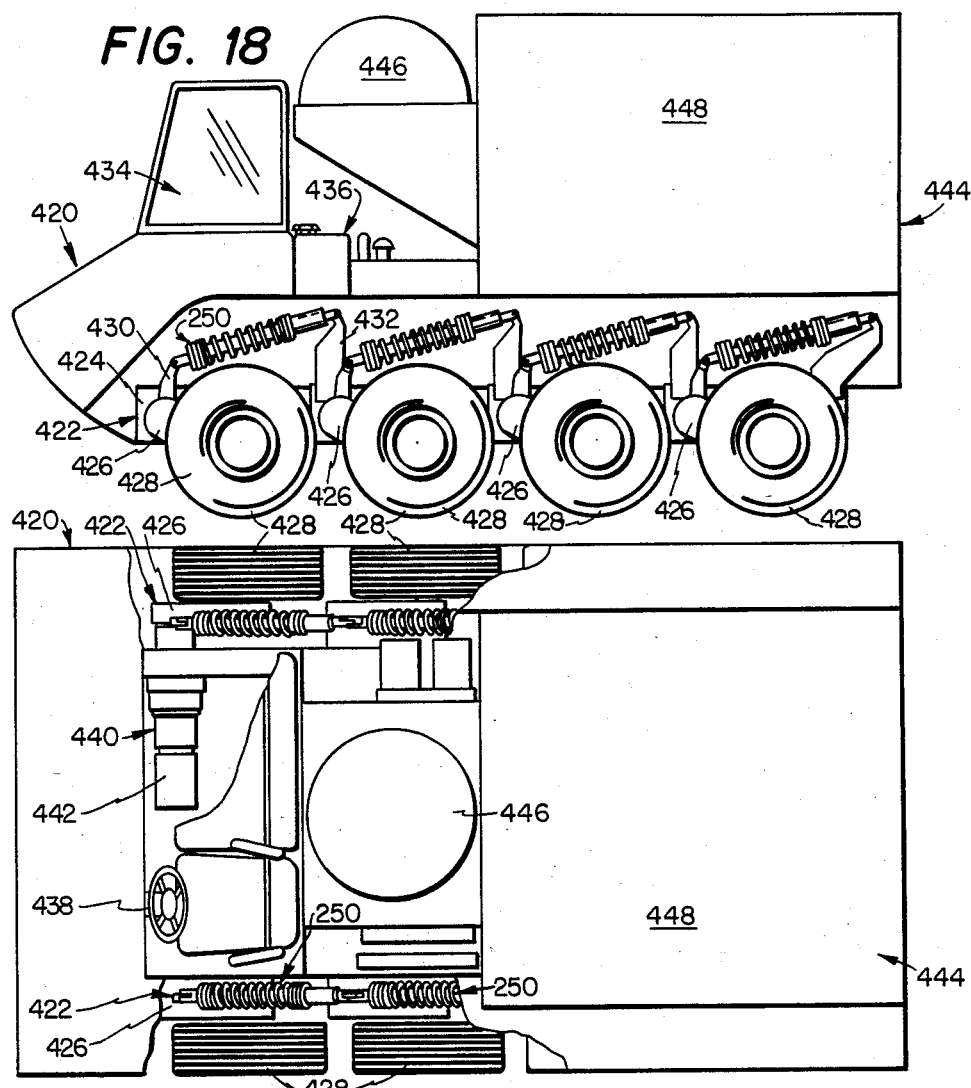
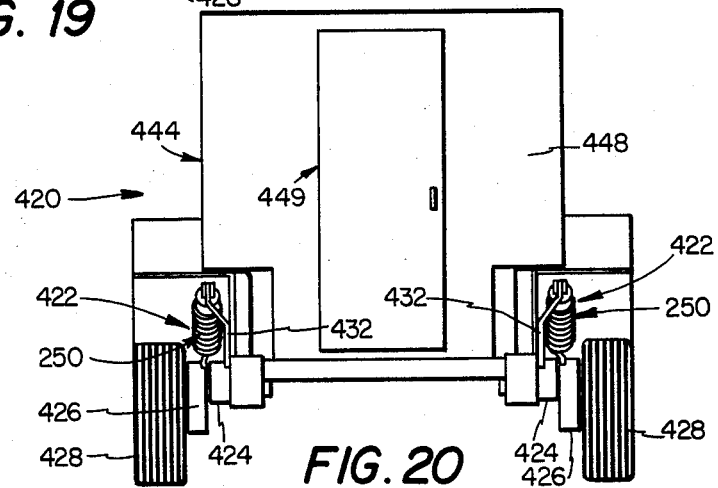

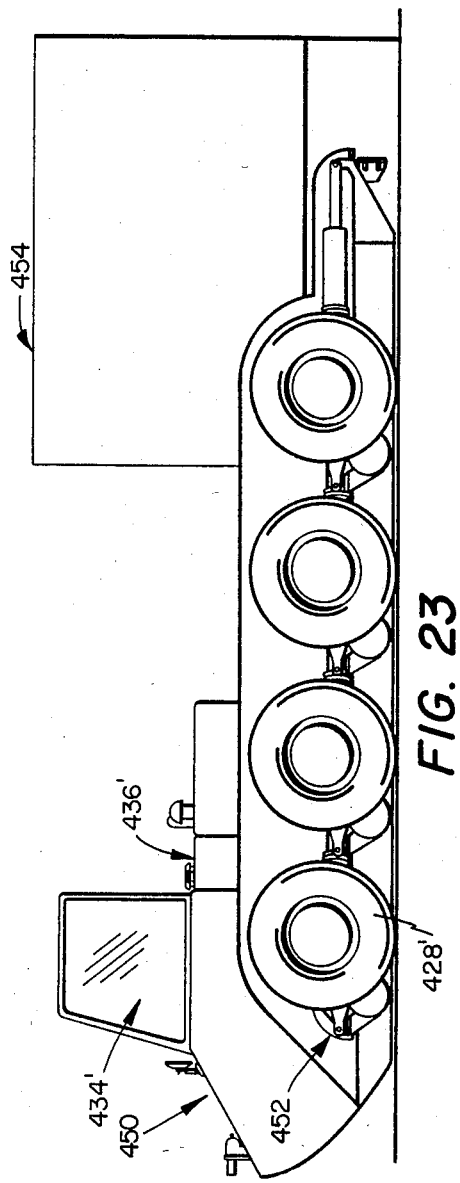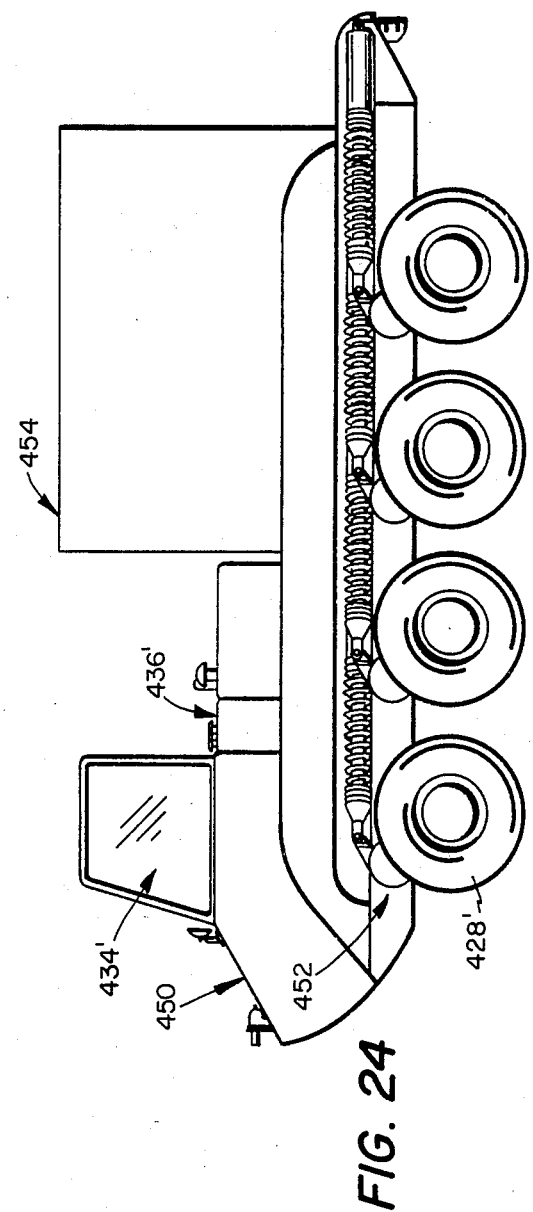

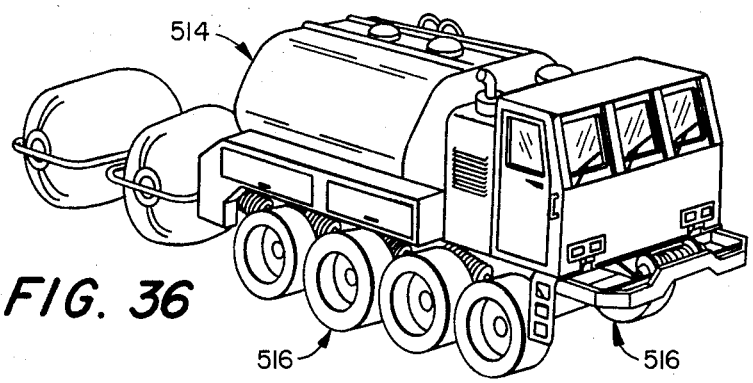
FIG. 36
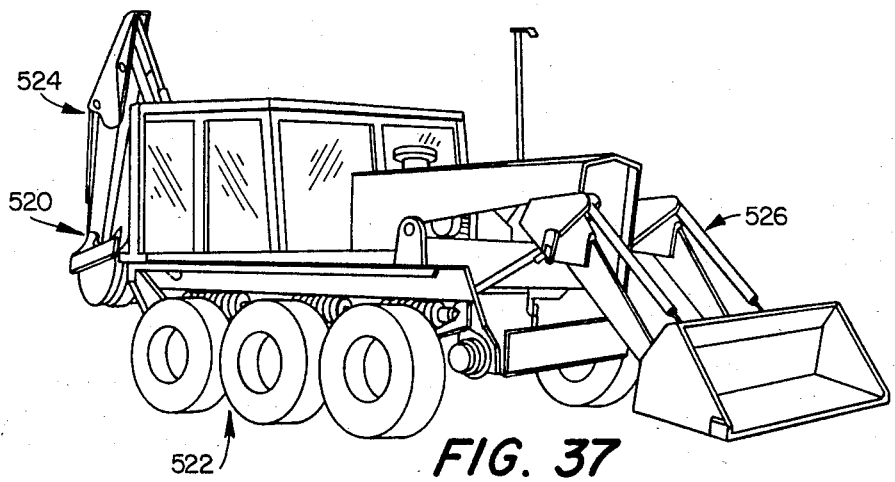
FIG. 37
FIG. 38
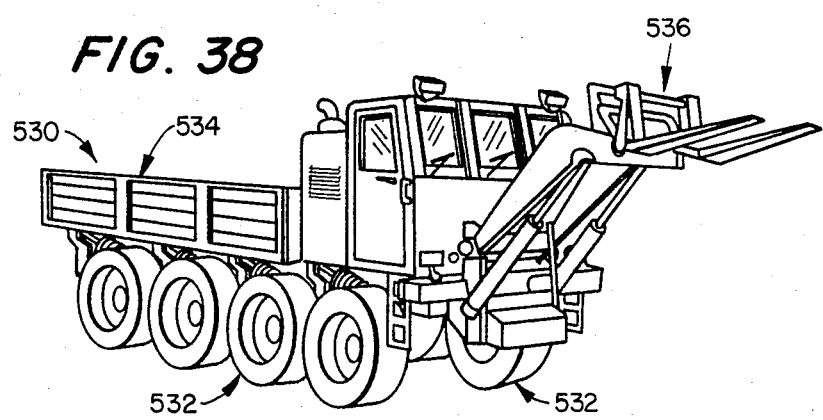

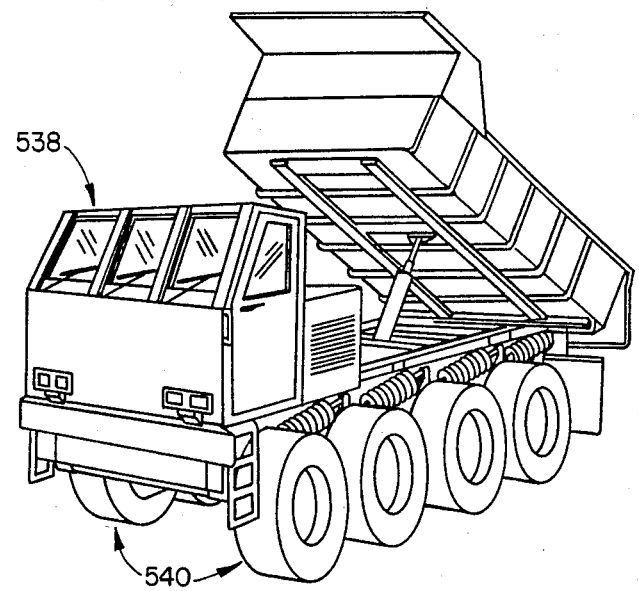
FIG. 39
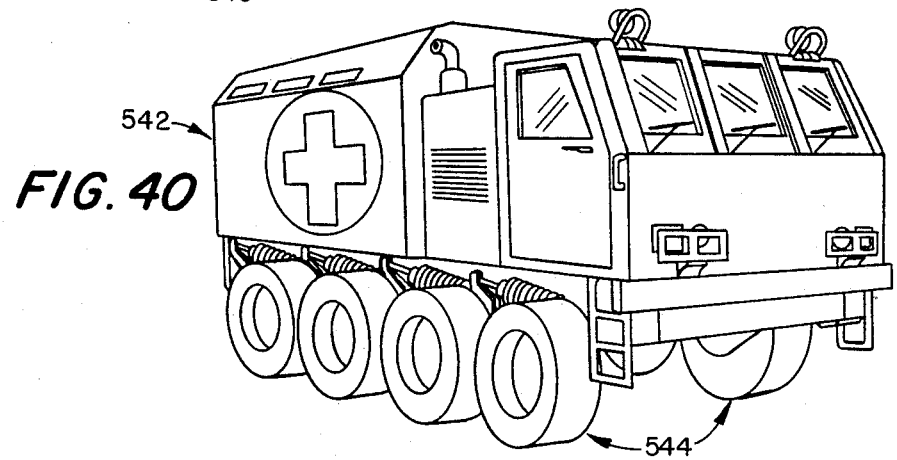
FIG. 40
FIG. 41
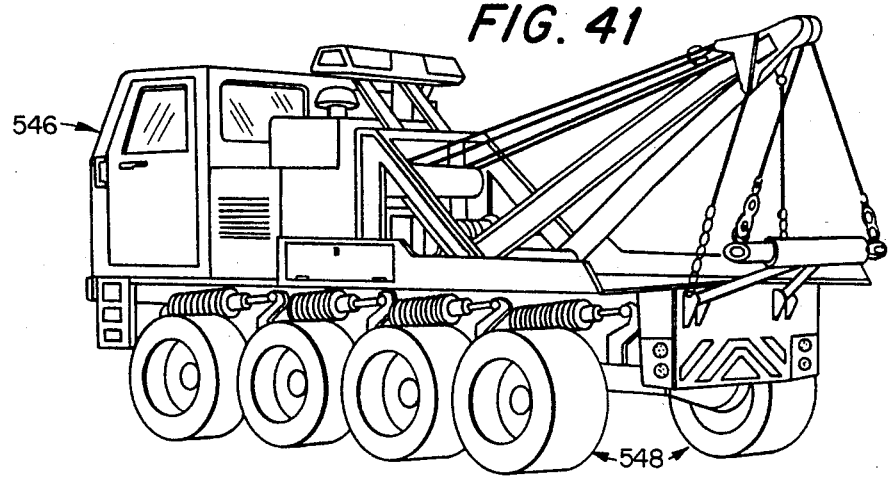

DISPLACEMENTS AT SELECTED POINTS

DISPLACEMENTS AT SELECTED POINTS

TRAILING ARM SUSPENSION

CROSS REFERENCE TO RELATED APPLICATIONS

This application is a continuation-in-part of copending application Ser. No. 506,403, filed June 21, 1983, which is in turn a continuation-in-part of U.S. application Ser. No. 426,218 filed Sept. 28, 1982 now U.S. Pat. No. 4,454,925.

TECHNICAL FIELD

This invention relates to vehicular undercarriages, and more particularly to an undercarriage adapted both for off road rough terrain usage and for on road high speed usage.

BACKGROUND AND SUMMARY OF THE INVENTION

Heretofore, military equipment such as tanks, armored personnel carriers and the like have generally comprised tracked vehicles. The advantages that are derived from the use of tracked vehicles in areas of highly adverse terrain are well known. It is also generally known that, at least for long term operation, tracked vehicles are limited to slow speeds such as 3 or 4 m.p.h. Thus, although some tanks can be driven as fast as 40 m.p.h., such operation requires the replacement of the tracks after as little as one or two days of high speed use.

The use of tracked vehicles came into vogue during World Wars I and II which were fought over vast areas and under such differing adverse terrains as beaches, farmlands, trenches, mountains, etc. Modern warfare often poses quite different problems. For example, terrorist activities or insurrections may require the deployment of military equipment over a substantial distance at very high speeds. Such deployment must be carried out under conditions of substantial comfort if the personnel involved are to arrive at the scene of conflict in a relatively fresh condition. Once at the scene the deploying vehicle must be capable of operating over highly adverse terrain including such obstacles as barricades, rubble from burned or bombed out buildings, bomb craters and the like.

Thus, a need exists for military equipment which is adapted for long term operation at relatively high speeds and under conditions of maximum comfort, while at the same time being capable of successfully negotiating various types of extremely adverse terrain. From the standpoint of practicality such equipment should resemble prior designs as closely as possible and in fact should incorporate parts common to currently utilized equipment insofar as is possible.

The present invention fulfills the foregoing and other objectives to provide an entirely unique undercarriage adapted for use with various types of military and civilian equipment. In accordance with the broader aspects of the invention, a superstructure, which may be identical to the of prior equipment designs, is supported on and transported over the underlying surface by a pair of undercarriages each incorporating the present invention. Each of the undercarriages comprises an elongate hollow primary load bearing frame. A plurality of primary axles are rotatably supported at longitudinally spaced points along the primary frame. A primary transmission mechanism extends through the primary frame for drivingly interconnecting the primary axles, and a drive mechanism is mounted on the primary frame for cooperation with the primary transmission mechanism to rotate the primary axles.

A plurality of secondary frames are pivotally supported on the primary frame, and a secondary axle is rotatably supported on each secondary frame. A secondary transmission mechanism extends through each secondary frame to provide a driving connection between one of the primary axles and the secondary axle carried by the secondary frame. Each secondary axle supports and drives a wheel member comprising an elastomeric tire. The secondary frames extend angularly downwardly and rearwardly from the primary frame and are substantially parallel to each other. Spring mechanisms urge the secondary frames to pivot away from the primary frame.

In a first embodiment of the invention, pivotal movement of the endmost secondary frames is under the action of one spring mechanism, while the pivotal movement of each center secondary frame is under the action of two spring mechanisms. By this means the wheel members of the center secondary frames engage the underlying surface under substantially greater force than the endmost wheel members, thereby facilitating skid steering of the vehicle. In a second embodiment of the invention, pivotal movement of each secondary frame is controlled by a spring/shock absorber assembly. The spring/shock absorber assemblies of the center wheels include hydraulic cylinders for normally positioning the center wheels below the endmost wheels to facilitate skid steering, and for selectively raising the center wheels for high speed operation. In a third embodiment of the invention, the pivotal movement of each secondary frame is controlled by a spring/shock absorber/hydraulic cylinder assembly. All of the hydraulic cylinders are double acting, thereby providing maximum control over the operation of vehicles incorporating the invention.

In accordance with more specific aspects of the invention, each secondary frame is hollow and contains the secondary transmission means individual thereto. Each secondary transmission means comprises a sprocket mounted on the associated primary axle, a sprocket mounted on the secondary axle rotatably supported on the secondary frame, and a drive chain drivingly interconnecting the two sprockets. Each secondary frame may include a disc brake for selective actuation to arrest rotation of the secondary axle rotatably supported therein and the wheel member carried by the secondary axle.

BRIEF DESCRIPTION OF THE DRAWINGS

A more complete understanding of the invention may be had by reference to the following Detailed Description when taken in conjunction with the accompanying Drawings, wherein:

FIG. 11 is an enlarged vertical sectional view of the undercarriage of FIG. 6;

FIG. 12 is a sectional view illustrating a spring/shock absorber/hydraulic cylinder assembly useful in the practice of a third embodiment of the invention;

FIG. 13 is a side view of a steering wheel position sensing apparatus useful in the practice of the invention and wherein certain parts have been broken away more clearly to illustrate certain features of the apparatus;

FIG. 14 is a sectional view taken along the line 14—14 in FIG. 13 in the direction of the arrows;

FIG. 18 is a side view of a vehicle having an undercarriage incorporating a first version of the third embodiment of the invention;

FIG. 19 is a top view of the vehicle of FIG. 18;

FIG. 20 is an end view of the vehicle of FIG. 18;

FIGS. 23 and 24 are illustrations of the vehicle of FIG. 21 showing the self-loading capability of the vehicle;

FIG. 36 is a perspective view of a fuel transport vehicle incorporating the third embodiment of the invention;

FIG. 37 is a perspective view of an excavating apparatus incorporating the third embodiment of the invention;

FIG. 38 is a perspective view of a flat bed truck having a fork lift apparatus mounted thereon which incorporates the third embodiment of the invention;

FIG. 39 is a perspective view of a dump truck which incorporates the third embodiment of the invention;

FIG. 40 is a perspective view of an ambulance which incorporates the third embodiment of the invention;

FIG. 41 is a perspective view of a wrecker which incorporates the third embodiment of the invention;

DETAILED DESCRIPTION

Figure 1:
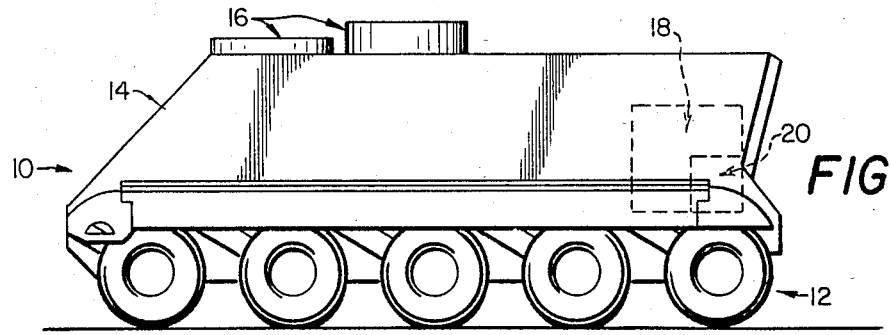
FIG. 1 is a side view of an armored personnel carrier incorporating the undercarriage constructed in accordance with a first embodiment of the invention.

Referring now to the Drawings, and particularly to FIG. 1 thereof, there is shown an armored personnel carrier 10 incorporating undercarriages 12 comprising a first embodiment of the present invention. The armored personnel carrier 10 includes a hull 14 having one or more hatches 16. The armored personnel carrier 10 may further include various weapons detection apparatus such as radar, and other accessories and features as required. The hull 14 encloses a prime mover 18 which may comprise a carburetor/ignition engine, a diesel engine, a gas turbine, etc. In accordance with the particular application of the invention illustrated in the Drawings, the prime mover 18 drives a hydrostatic pump 20 which supplies pressurized hydraulic fluid for operating the undercarriages 12 of the present invention. However, other drive systems may be utilized in the practice of the invention, if desired.

The hull 14 and the prime mover 18 of the armored personnel carrier 10 do not comprise part of the invention. In fact, one of the important features of the invention involves the fact that the undercarriages 12 may be utilized to support and drive an armored personnel carrier comprising a hull 14 and a prime mover 18 of conventional design. That is, the undercarriages 12 of the present invention may be utilized in conjunction with a conventional armored personnel carrier hull 14 having a conventional prime mover 18 in lieu of the tracks which are conventionally used in conjunction therewith.

Figure 2:
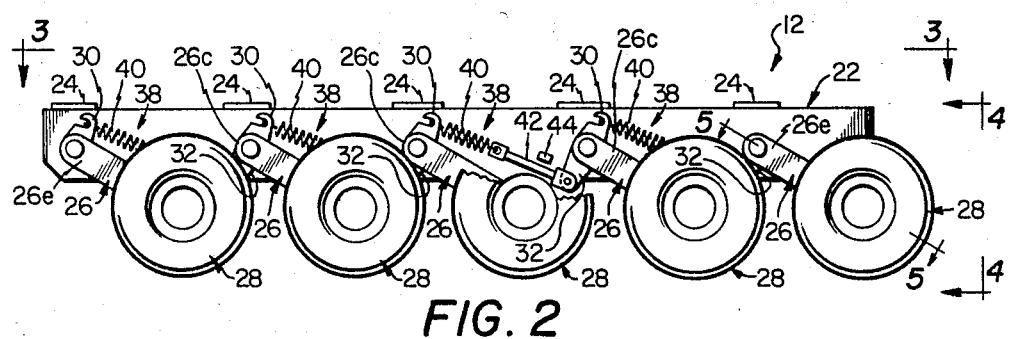
FIG. 2 is a side view of the undercarriage of the armored personnel carrier of FIG. 1 in which certain parts have been broken away more clearly to illustrate certain features of the invention.

Referring now to FIG. 2, each undercarriage 12 of the armored personnel carrier 10 comprises an elongate hollow load bearing primary frame 22. The primary frame 22 is of uniform cross sectional configuration throughout its length. This is an important feature of the invention in that it permits the primary frame 22 to be connected to the hull 14 of the armored personnel carrier 10 at any point along its entire length and at any point around its entire periphery without necessitating either redesign of the attachment apparatus of the hull 14 or providing special portions of the primary frame 22 to permit attachment of the hull 14 thereto. A plurality of access ports 24 are provided along the top surface of the primary frame 22 to facilitate assembly of the undercarriage 12 and also to permit periodic maintenance.

A plurality of secondary frames 26 are supported on the primary frame 22 for pivotal movement with respect thereto. Each of the secondary frames 26 in turn supports a wheel member 28 at the distal end thereof. The wheel members 28 preferably comprise elastomeric tires, although other types of wheels and/or tires may be utilized in the practice of the invention, if desired.

In accordance with the embodiment of the invention illustrated in FIGS. 1-5, each undercarriage 12 comprises five secondary frames 26 and five wheel members 28 carried thereby. It will be understood that the precise number of secondary frames and wheel members which are utilized in a particular undercarriage is not critical to the practice of the invention. In those instances in which five secondary frames 26 are utilized, there is provided two endmost secondary frames 26e and three center secondary frames 26c.

The forward secondary frame 26e comprises a single lever arm 30 facing rearwardly toward the adjacent center secondary frame 26c. Each of the center secondary frames 26c includes a dual lever arm comprising a lever arm 30 facing the next rearwardly positioned secondary frame and a lever arm 32 facing the next forwardly positioned secondary frame. The rear secondary frames 26e comprises a single lever arm 32 facing the next adjacent center secondary frame 26c.

The undercarriage 12 further includes a plurality of spring mechanisms 38 which interconnect the lever arms 30 and 32 of the secondary frames 26. Thus, one of the spring mechanisms 38 interconnects the lever arm 30 of the forward secondary frame 26e and the lever arm 32 of the next adjacent center secondary frame 26c.

In turn, a spring mechanism 38 interconnects the lever arm 30 of the forward secondary frame 26c and the lever arm 32 of the middle secondary frame 26c. Likewise, a spring mechanism 38 interconnects the lever arm 30 of the middle secondary frame 26c and the lever arm 32 of the rearward secondary frame 26c. Finally, a spring mecanism 38 interconnects the lever arm 30 of the rearward secondary frame 26c and the lever arm 32 of the secondary frame 26e situated at the rear of the undercarriage 12.

Each of the spring mechanisms 38 comprises a tension spring 40 and an adjusting mechanism 42 for varying the tension of the spring 40. The adjusting mechanism 42 may comprise any of the various well known types, for example, the adjusting mechanism 42 may comprise a screw which is received in a nut to adjust the distance between the points of attachment of the tension spring 40 and thereby control the tension of the spring. A stop member 44 may be provided for limiting pivotal movement of each secondary frame 26.

As is the case in conventional armored personnel carriers incorporating track-type undercarriages, the armored personnel carrier of FIG. 1 utilizing the undercarriages 12 of the present invention is skid steered. It has been determined that the effort required to effect steeering of a skid steered vehicle can be substantially reduced when the wheel base of the vehicle is minimized. Conversely, in many all terrain vehicles it is desirable to increase the wheel base length for such purposes as increasing stability, increasing traction, increasing flotation and providing a more comfortable ride.

These seemingly divergent requirements are accomplished in the undercarriage of the present invention by means of the pivotally supported secondary frames 26 which are interconnected by the spring mechanisms 38. Having reference particularly to FIGS. 2 and 3, it will be understood that the spring mechansims 38 urge all of the secondary frames 26 and the wheel members 28 carried thereby to pivot away from the primary frame 22. However, whereas each of the endmost secondary frames 26e is urged to pivot away from the primary frame 22 by a single spring mechanism 38, each of the center secondary frames 26c is urged to pivot away from the primary frame 22 by two spring mechanisms 38. Thus, the pivoting spring force which is applied to the center secondary frames 26c is substantially double that which is applied to the endmost secondary frames 26e.

The foregoing arrangement allows the use of five wheel members 28 on each of the undercarriages 12 of the armored personnel carrier 10. This is highly desirable in that it increases stability, particularly in those cases in which the loading of the armored personnel carrier may be uneven, in that it substantially increases traction by increasing the number of wheels which are engaged with the underlying surface, in that it provides increased flotation during operation over unstable surfaces, and that it increases comfort for persons riding in the armored personnel carrier by smoothing the movement thereof over obstacles, trenches and the like. Moreover, because of the arrangement of the spring mechanisms 38, the wheel members 28 carried by the three center secondary frames 26c support approximately 80% of the load which is carried by the undercarriages 12, while the wheel members 28 carried by the two endmost secondary frames 26e carry approximately 20% of the load. Because of the substantially increased loading of the three center wheel members 28, the effective wheel base of the armored personnel carrier is substantially reduced insofar as skid steering is concerned. Thus, the particular arrangement of secondary frames and spring mechanisms which is utilized in the embodiment of the invention illustrated in FIGS. 1-5 provides the dual advantages of a long wheel base vehicle insofar as stability, traction, flotation and passenger comfort are concerned while providing the advantages of a short wheel base vehicle with respect to the effort required to effect skid steering.

Figure 3:
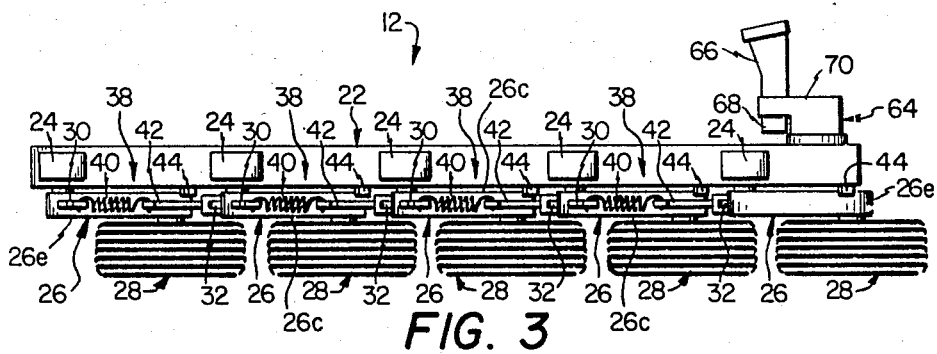
FIG. 3 is a top view of the undercarriage of FIG. 2 taken along the line 3—3 in FIG. 2 in the direction of the arrows.
Figure 4:
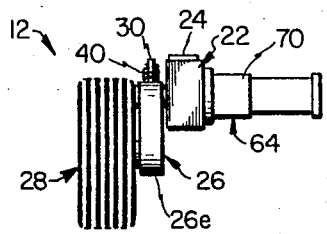
FIG. 4 is an end view of the undercarriage of FIG. 2 taken along the line 4—4 in FIG. 2 in the direction of the arrows.
Figure 5:
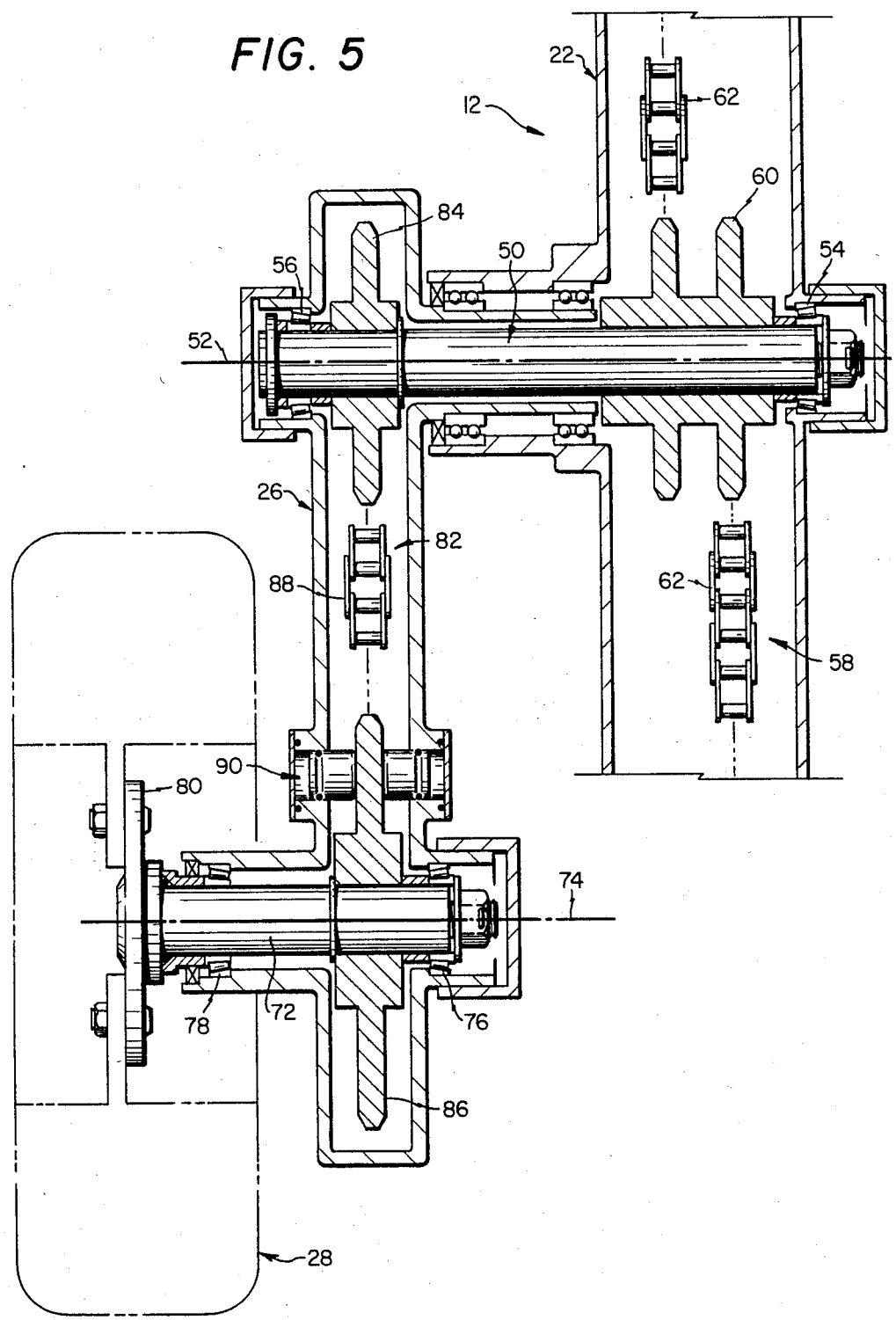
FIG. 5 is a sectional view taken along the line 5—5 in FIG. 2 in the direction of the arrows.

Referring now to FIGS. 3, 4 and 5, the undercarriage 12 of the present invention is shown in greater detail. A plurality of primary axles 50 are positioned at longitudinally spaced points along the primary frame 22. Each primary axle 50 is supported for rotation about an axis 52 by a tapered roller bearing 54 mounted in the primary frame 22 and a tapered roller bearing 56 mounted in the secondary frame 26 individual to the particular axle 50. A primary transmission 58 extends through the primary frame 22 and drivingly interconnects the primary axles 50. The primary transmission 58 comprises a plurality of drive sprockets 60 each mounted on one of the primary axles 50. The drive sprockets 60 are drivingly interconnected by a plurality of drive chains 62.

As is best shown in FIGS. 3 and 4, the undercarriage 12 further comprises a drive mechanism 64. The drive mechanism 64 is mounted on the primary frame 22 and is operatively connected to the primary transmission 58 for cooperation therewith to effect rotation of all of the primary axles 50. The drive mechanism 64 includes a hydrostatic motor 66 which is driven by pressurized hydraulic fluid received from the hydrostatic pump 20 which is driven by the prime mover 18 of the armored personnel carrier 10. The drive mechanism 64 further includes a fail safe brake 68 which comprises the primary braking mechanism for the armored personnel carrier 10 in that upon actuation thereof, operation of the entire undercarriage 12 is arrested. Finally, the drive mechanism 64 includes a planetary speed reducer 70.

The driving connecton between the drive mechanism 64 and the primary transmission 58 of the undercarriage 12 comprises a shaft extending from the planetary speed reducer 70 and having a drive sprocket mounted thereon. The drive sprocket of the output shaft of the planetary speed reducer 70 is in turn drivingly connected to one of the drive sprockets 60 of the primary transmission 58 by a drive chain.

Referring again to FIG. 5, a secondary axle 72 is supported by each of the secondary frames 26. Each secondary axle 72 is supported for rotation about an axis 74 by a pair of tapered roller bearings 76 and 78. The axis 74 extends parallel to the axis 52 of the primary axle 50. The secondary axle 72 extends to a wheel engaging member 80 having the wheel member 28 mounted thereon.

Each secondary frame 26 encloses a secondary transmission 82 which comprises a driving connection between one of the primary axles 50 and the secondary axle 72 individual thereto. Each secondary transmission 82 comprises a sprocket 84 mounted on the primary axle 50, a sprocket 86 mounted on the secondary axle 72 and a drive chain 88 drivingly interconnecting the sprockets 84 and 86. It will thus be understood that upon rotation of the primary axles 50 under the action of the drive mechanism 64 and the primary transmission 58, the secondary transmissions 82 effect rotation of all of the secondary axles 72 and the wheel members 28 carried thereby.

Each secondary frame 26 further includes a disk brake mechanism 90. Upon actuation, the disk brake mechanism 90 arrests rotation of the sprocket 86 of the secondary transmission 82 contained within the particular secondary frame 26 and therefore arrests rotation of the wheel member 28 driven thereby. The disk brake mechnisms 90 of the secondary frames 26 comprise the secondary braking system for the undercarriage 12 in that actuation of all of the disk brakes 90 is necessary in order to fully arrest operation of the driving components of the undercarriage.

Figure 6:
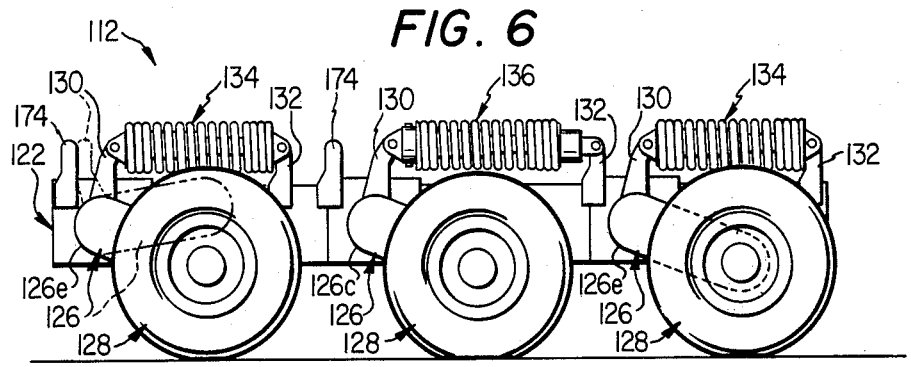
FIG. 6 is a side view of an undercarriage constructed in accordance with a second embodiment of the invention.

Referring now to FIG. 6, there is shown an undercarriage 112 incorporating a second embodiment of the invention. The undercarriage 112 comprises an elongate hollow load bearing primary frame 122. The primary frame 122 has a uniform cross sectional configuration throughout its length. This is an important feature of the invention in that it permits the primary frame 122 to be connected to a superstructure at any point along its entire periphery without necessitating either redesign of the superstucture or providing special attachment portions of the primary frame 122 to permit attachment of the superstructure thereto.

A plurality of secondary frames 126 are supported on the primary frame 122 for pivotal movement with respect thereto. Each of the secondary frames 126 in turn rotatably supports a wheel member 128 at the distal end thereof. The wheel members 128 perferably comprise elastomeric tires, although other types of wheels and/or tires may be utilized in the practice of the invention, if desired.

In accordance with the embodiment of the invention illustrated in FIGS. 6-11, the undercarriage 112 comprises three secondary frames 126 and three wheel members 128 carried thereby. It will be understood that the precise number of secondary frames and wheel members which are utilized in a particular undercarriage is not critical to the practice of the invention. In those instances in which three secondary frames 126 are utilized, there is provided two endmost secondary frames 126e and one center secondary frame 126c.

Each of the secondary frames 126 has an upwardly extending arm 130 secured thereto. The primary frame 122 has a plurality of arms 132 extending upwardly therefrom. The arms 132 are positioned substantially in alignment with the arms 130. In the case of the two endmost secondary frames 126e, a spring/shock abosrber assembly 134 is connected between the corresponding arms 130 and 132. In the case of the center secondary frame 126c, a spring/shock absorbr/cylinder assembly 136 is connected between the corresponding arms 130 and 132.

Figure 7:
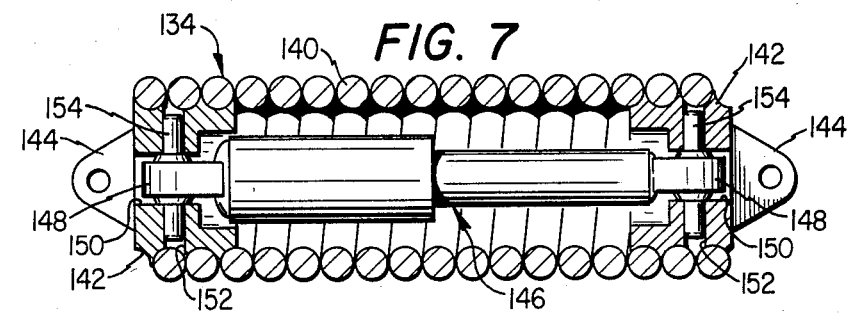
FIG. 7 is an enlarged sectional view illustrating the spring/shock absorber assemblies of the undercarriage of FIG. 6.

The construction of the spring/shock absorber assemblies 134 of the endmost secondary frames 126e is illustrated in FIG. 7. A coil spring 140 has a pair of end blocks 142 threadedly engaged with the end portions thereof. The end blocks 142 are thus retained in engagement with the spring 140 while permitting full extension and retraction of the unattached center portion of the spring. Each end block 142 has a clevis 144 extending therefrom for connection to one of the arms 130 or 132.

A conventional shock absorber 146 of the automotive type is positioned within the spring 140. The shock absorber 146 has conventional connecting portions 148 extending from the opposite ends thereof. The end blocks 142 have longitudinally extending passageways 150 formed therein for receving the connecting portions 148 of the shock absorber 146. The end blocks 142 also have transversely extending passageways 152 formed therethrough. The passageways 152 receive pins 154 which also extend through the connecting portions 148 of the shock absorber 146. In this manner the shock absorber 146 is retained in engagement with the end blocks 142 of the spring/shock absorber assembly 134.

Figure 8:
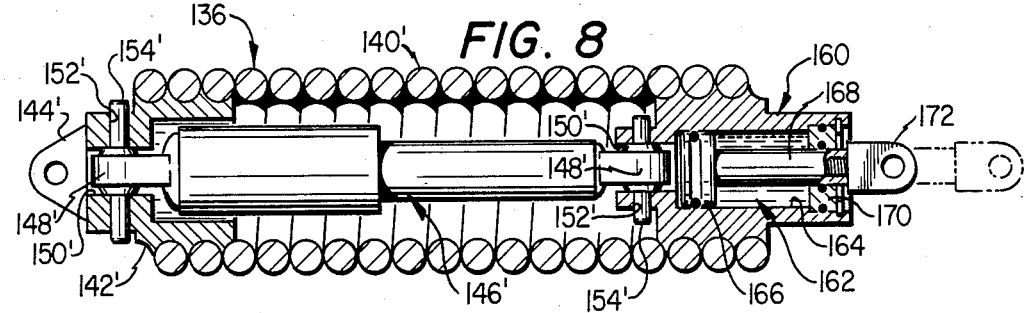
FIG. 8 is a view similar to FIG. 7 illustrating a spring/shock absorber/cylinder assembly.

The construction of the spring/shock absorber/cylinder assembly 136 is illustrated in FIG. 8. The spring/shock absorber/cylinder assembly 136 utilizes numerous component parts which are substantially identical in construction and function to component parts of the spring/shock absorber assembly 134 illustrated in FIG. 7 and described hereinabove in connection therewith. Such identical component parts are designated in FIG. 8 with the same reference numerals utilized in the description of the spring/shock absorber assembly 134, but are differentiated threrefrom by means of a (') designation.

The primary distinction between the spring/shock absorber assembly 134 of FIG. 7 and the spring/shock absorber/cylinder assembly 136 of FIG. 8 involves the fact that the assembly 136 includes an end cap 160 comprising a hydraulic cylinder 162. The hydraulic cylinder 162 is of the single acting variety and comprises a bore 164 formed in the end cap 160 and a piston 166 mounted for reciprocation in the bore 164 under the action of hyraulic pressure. A piston rod 168 extends from the piston 166 through a closure 170 which seals the bore 164. A clevis 172 is secured to the piston rod 168 for reciprocation therewith.

Referring again to FIG. 6, pivotal motion of the endmost secondary frames 126e is controlled by the coil springs 140 and the shock absorbers 146 mounted therein, and pivotal movement of the center secondary frame 126c is controlled by the coil spring 140' and the shock absorber 146' mounted therein. Upward pivotal movement of the secondary frames 126 is against the action of the springs and is limited by stop arms 174 mounted on the primary frame 122. (The arm 132 connected to the spring/shock absorber/cylinder assembly 136 also serves as a stop arm for the endmost secondary frame 126e adjacent thereto.) Downward pivotal movement of the secondary frames 126 is limited by full collapse of the springs 140 and 140'. In actual practice, the exent of upward pivotal movement of the secondary frames 126 as permitted by the stop arms is approximately 20° and downward pivotal movement of the secondary frames 126 as permitted by the full collapse of the springs is approximately 10°.

Figures 9, 10:
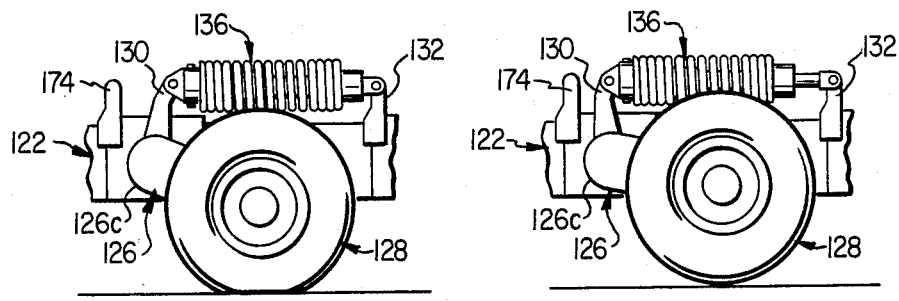
FIGS. 9 and 10 are illustrations of the operation of the spring/shock absorber/cylinder assembly of FIG. 8.

The undercarriage 112 is normally operated with the piston 166 of the spring/shock absorber/cylinder assembly 136 positioned as shown in FIG. 8, that is, with pressurized hydraulic fluid admitted to the bore 164 and the clevis 172 therefore fully retracted. As is best shown in FIGS. 6 and 9, the retracted positioning of the clevis 172 locates the wheel member 128 mounted on the center secondary frame 126c below a plane extending tangent to the wheel members 128 mounted on the endmost secondary frames 126e. It has been found that the positioning of the wheel member 128 mounted on the secondary frame 126c below a plane extending tangent to the wheel members 128 mounted on the secondary frames 126e substantially facilitates skid steering of a vehicle incorporating the undercarriage 112.

Upon release of pressurized hydraulic fluid from the bore 164, the clevis 172 is allowed to extend to the position shown in dashed lines in FIG. 8. When the clevis 172 is so extended the wheel member 128 mounted on the secondary frame 126c is allowed to pivot upwardly to the position shown in FIG. 10. It has been found that the positioning of the wheel 128 mounted on the secondary frame 126c in alignment with the endmost wheel member 128 facilitates the operation of a vehicle incorporating the undercarriage 112 at high speeds, for example, 30 to 40 m.p.h. or more. In addition, such positioning of the wheel member 128 mounted on the secondary frame 126c substantially stabilizes a vehicle incorporating the undercarriage 112 against fore and aft rocking motion, and is therefore highly advantageous in those instances in which increased stability is necessary or desirable.

The undercarriage 112 illustrated in FIG. 6 is comprising a spring/shock absorber assembly 134 connected to each of the endmost secondary frames 126e and a spring/shock absorber/cylinder assembly 136 connected to the center secondary frame 126c. It will be understood, however, that the undercarriage 112 will functon equally well with the spring/shock absorber/cylinder assembly 136 connected to one of the endmost secondary frames 126e, and with the center secondary frame 126c having a spring/shock absorber assembly 134 connected thereto. In such cases the spring/shock absorber/cylinder assembly 136 is normally operated to position the wheel member 128 associated therewith above a plane extending tangent to the center wheel member 128 and to the other endmost wheel member 128. In this manner the undercarriage operates exactly as described above in conjunction with FIG. 6 even though the mounting of the spring/shock absorber/cylinder assembly 136 and one of the spring/shock absorber assemblies 134 is reversed.

In certain applications of the invention it will be advantageous to connect a spring/shock absorber cylinder assembly between each arm 130 and the arm 132 corresponding thereto. For example, when an undercarriage is so constructed the spring/shock absorber/cylinder assemblies can be actuated to increase ground clearance, thereby allowing a vehicle incorporating the undercarriage to pass over obstacles. The spring/shock absorber/cylinder assemblies can also be used to stabilize and locate the superstructure of a vehicle incorporating the undercarriage in order to effect proper positioning of weapons, surveillance equipment, etc., even though the vehicle is operating on a hillside, etc.

The undercarriage 112 is illustrated in FIG. 6 as comprising three wheels. It will be understood, however, that the undercarriage may comprise four, five, or more wheels in accordance with particular applications of the invention. In the case of a four wheel version the two center wheels are normally positioned below a plane extending tangent to the two endmost wheels, on five wheel versions the three center wheels are normally positioned below a plane extending tangent to the two endmost wheels, etc.

Referring now to FIG. 11, the undercarriage 112 comprising the second embodiment of the invention is illustrated in greater detail. A plurality of primary axles 180 are positioned at longitudinally spaced points along the primary frame 112. Each primary axle 180 is supported for rotation about an axis 182 by a tapered roller bearing 184 mounted in the primary frame 122 and a tapered roller bearing 186 mounted in the secondary frame 126 individual to the particular axle 180. A primary transmission 188 extends through the primary frame 122 and drivingly interconnects the primary axles 180. The primary transmission 188 comprises a plurality of drive sprockets 190. Each primary axle 180 has at least one drive sprocket 190 mounted thereon. The drive sprockets 190 are drivingly interconnected by a plurality of drive chains. Other types of transmissions may be used to drivingly interconnect the primary axles, if desired.

The undercarriage 112 further comprises a drive mechanism 194. The drive mechanism 194 is mounted on the primary frame 122 and is operatively connected to the primary transmission 188 for cooperation therewith to effect rotation of all of the primary axles 180. The drive mechanism 194 includes a hydrostatic motor 196 which is driven by pressurized hydraulic fluid received from a hydrostatic pump which is in turn driven by a prime mover mounted on a superstructure supported on the undercarriage 112. The drive mechanism 194 futher includes a planetary speed reducer 198. The output of the planetary speed reducer 198 comprises an internal spline 200 which receives an external spline 201 mounted on one of the primary axles 180. The remaining primary axles 180 have an end cap in lieu of the external spline 201. It will be understood that although a hydrostatic drive is illustrated and described in conjunction with the undercarriage 112, the invention is not limited to such drive systems, and may instead incorporate hydraulic, electrical, pneumatic, and/or mechanical drive systems with equal facility.

The secondary frame 126 is pivotally supported on the primary frame 122 by a ball bearing 202 and a tapered roller bearing 203. A seal 204 is used to prevent entry of foreign matter. A secondary axle 205 is supported by each of the secondary frames 126. Each secondary axle 205 is supported for rotation about an axis 206 by a pair of tapered roller bearings 207 and 208. The axis 206 extends parallel to the axis 182 of the primary axle 180. The secondary axle 205 extends to a wheel engaging member 209 having the wheel member 128 mounted thereon. A seal 210 is employed to prevent the entry of foreign matter.

Each secondary frame 126 encloses a secondary transmission 212 which comprises a driving connection between one of the primary axles 180 and the secondary axle 205 individual thereto. Each secondary transmission 212 comprises a sprocket 214 mounted on the primary axle 180, a sprocket 216 mounted on the secondary axle 205 and a drive chain 218 drivingly interconnecting the sprockets 214 and 216. it will thus be understood that upon rotation of the primary axles 180 under the action of the drive mechanism 194 and the primary transmission 188, the secondary transmission 212 effect rotation of all of the secondary axles 205 and the wheel members 128 carried thereby.

Each secondary frame 126 further includes a disk brake mechanism 220. Upon actuation, the disk brake mechanism 220 arrests rotation of a plate 222 carried by the wheel engaging member 209 for rotation therewith. The disk brake mechanisms 220 comprising the undercarriage 112 are adapted for simultaneous actuation, whereupon rotation of the wheel members 128 comprising the undercarriage 112 is simultaneously arrested.

Referring now to FIG. 12, there is shown a spring/shock absorber/hydraulic cylinder assembly 250 useful in the practice of a third embodiment of the invention. The spring/shock absorber/hydraulic cylinder assembly 250 includes an elongate coil spring 252. A first end member 254 is threadedly engaged with one end of the spring 252. An attachment bracket 256 having an attachment aperture 258 formed therethrough is secured to the end member 254 by fasteners 260. The bracket 256 includes a tubular portion 262 which extends through the end member 254 to define a shock absorber receiving passageway 264.

A shock absorber 270 is positioned within the coil spring 252. The shock absorber 270 may comprise any of the various types conventionally utilized in automotive and similar appications, and is provided with conventional attachment apparatus 272 and 274 located at the opposite ends thereof. A pin 276 is received through the attachment apparatus 272 of the shock absorber 270 and through aligned apertures formed in the bracket 256 to secure the shock absorber to the bracket. This in turn secures one end of the shock absorber 270 to the end member 254 and ultimately to the end of the coil spring 252 threadedly engaged therewith.

An end member 280 is threadedly engaged with the opposite end of the spring 252. The end member 280 is provided with a blind passageway 282 which receives the attachment apparatus 274 of the shock absorber 270. A pin 284 is received through the attachment apparatus 274 and through aligned apertures formed in the end member 280 to secure the shock absorber 270 to the end member 280 and therefore to the end of the coil spring 252 threadedly engaged therewith.

The end member 280 is further provided with a hydraulic cylinder receiving aperture 290. A hydraulic passageway 292 extends from a port 294 to a reduced end portion 296 of the aperture 290. A hydraulic cylinder 300 is received in the aperture 290 and is secured therein by means of fasteners 302. An O-ring seal 304 is provided between a flange 306 of the hydraulic cylinder 300 and the adjacent end surface of the end member 280.

The hydraulic cylinder 300 is open at one end and therefore communicates with the port 294 through the passageway 292 and the reduced end portion 296 of the aperture 290. A port 308 is provided at the opposite end of the hydraulic cylinder 300 and communicates with the interior thereof through a passageway 310. A piston 312 is located within the hydraulic cylinder 300 for reciprocation therein under the action of pressurized hydraulic fluid received either through the port 294 or through the port 308. The piston 312 is provided with an O-ring seal 314.

A piston rod 316 extends from the piston 312 through an end plate 318 which is secured in the hydraulic cylinder by a snap ring 320. O-ring seals 322 and 324 are provided between the end plate 318 and the hydraulic cylinder 300 and between the end plate 318 and the piston rod 316, respectively. A bracket 326 is mounted on the piston rod 316 and is provided with an attachment aperture 328.

The spring/shock absorber/hydraulic cylinder assembly 250 is utilized in the practice of a third embodiment of the invention. In accordance with the third embodiment, an undercarriage is constructed substantially as shown in FIGS. 5 and 11. That is, a primary frame extends longitudinally and has a primary transmission extending therethrough. A plurality of secondary frames are pivotally supported on the primary frame and extend angularly downwardly therefrom. Wheel members are in turn rotatably supported on the lower ends of the secondary frames. A secondary transmission extends through each secondary frame and serves to drivingly interconnect the primary transmission and the wheel member that is carried by the secondary frame having the secondary transmission extending therethrough.

The primary distinction between the three embodiments of the invention comprises the apparatus that is utilized to control the pivotal relationship between each secondary frame and the primary frame. In accordance with the first embodiment of the invention, this function is performed by the tension springs 40. In the second embodiment of the invention this function is performed by the spring/shock absorber assemblies 134 in the case of the endmost wheel members, and by the spring/shock absorber/cylinder assembly 136 in the case of the center wheel members. In the third embodiment of the invention this function is performed by the spring/shock absorber/hydraulic cylinder assembly 250 shown in FIG. 12 with respect to all of the secondary frames.

The spring/shock absorber/hydraulic cylinder assembly 250 of the third embodiment of the invention is similar in many respects to the spring/shock absorber/cylinder assembly 136 of the second embodiment. The primary distinction between the spring/shock absorber/hydraulic cylinder assembly 250 and the spring/shock absorber/cylinder assembly 136 involves the fact that the assembly 250 incorporates a double acting hydraulic cylinder 300. This feature of the third embodiment of the invention is highly advantageous in that it permits complete control over the positioning of every wheel member of an undercarriage constructed in accordance therewith.

For example, during the operation of a vehicle equipped with undercarriages comprising the third embodiment of the invention, it might be desirable for one reason or another to lower one side of the vehicle. In such instances, the hydraulic cylinders 300 comprising the spring/shock absorber/hydraulic cylinder assemblies 250 on one side of the vehicle are operated simultaneously to perform this function. Similarly, hydraulic cylinders 300 of various spring/shock absorber/hydraulic cylinder assemblies 250 comprising the undercarriage of the vehicle may be actuated simultaneously to raise or to lower one end of the vehicle with respect to the other end. An extremely important function provided by the use of the spring/shock absorber/hydraulic cylinder assemblies 250 in undercarriages comprising the third embodiment of the invention comprises the ability to automatically position the wheels of the vehicle to effect steering and/or turning operations.

Vehicles equipped with undercarriages incorporating the third embodiment of the invention will almost always comprise skid steered vehicles. In many instances it is advantageous for all of the wheels of such a vehicle to engage the underlying surface substantially equally. Examples include operation of the vehicle over highways and other relatively smooth surfaces at high speed, operation of the vehicle over very soft surfaces, operations requiring extraordinary stability, etc. On the other hand, during turning operations it is advantageous if the center wheels of the vehicle are positioned somewhat below a plane extending tangent to the endmost wheels. In this manner the power required to effect steering and other turning operations is substantially reduced.

FIGS. 13, 14, 15 and 16 illustrate a system for automatically positioning the wheels of a vehicle incorporating undercarriages constructed in accordance with the third embodiment of the invention to effect steering and/or turning operations. Referring first to FIGS. 13 and 14, a steering shaft 340 extends from a steering wheel through a plate 342. A plurality of posts 344 are secured to the plate 342 and in turn support a plate 346. A sleeve 348 is secured to the steering shaft 340 by a pin 350. An arm 352 normally extends upwardly from the sleeve 348 and a segment 354 normally extends downwardly therefrom. A torsion spring 356 is wound around the sleeve 348 and includes end portions 358 and 360 positioned on opposite sides of one of the posts 344. The arm 352 includes a perpendicularly extending portion 362 which extends between the end portions 358 and 360 of the torsion spring 356.

The torsion spring 356 thus acts as a centering device for the steering shaft 340 and the steering wheel attached thereto. That is, whenever the operator releases the steering wheel, the torsion spring 356 functions to return the steering wheel on the steering mechanism controlled thereby to a neutral position. This means that a vehicle incorporating the apparatus of FIGS. 13 and 14 automatically returns to a straight ahead course as soon as the steering wheel is released by the operator.

A proximity sensor 370 is supported on the plate 346 directly beneath the steering shaft 340 and in the same vertical plane as the normal positioning of the perpendicularly extending portion 362 of the arm 352 under the action of the end portions 358 and 360 of the torsion spring 356. Thus, as is shown in full lines in FIG. 14, the segment 354 is normally aligned with the proximity sensor 370. In such instances the proximity sensor 370 produces a first predetermined output. Whenever the steering shaft 340 is rotated sufficiently to bring the arm 352 and the segment 354 into the positions shown in phantom lines in FIG. 14, the proximity sensor 370 shifts to a second predetermined output. Such positioning of the segment 354 relative to the proximity sensor is indicative of rotation of the steering wheel attached to the steering shaft 340 sufficiently to require the positioning of the wheels of the vehicle in a steering or turning mode.

A potentiometer 374 is supported on a bracket 376 and is connected to the end of the steering shaft 340. The potentiometer 374 produces an output indicative of the annular positioning of the steering shaft. That is, when the steering shaft 340 is centered under the action of the torsion spring 356, the potentiometer 374 produces no output. When the steering shaft 340 is rotated in one direction the potentiometer 374 produces a positive output proportional to the extent of rotation of the shaft, and when the steering shaft 340 is rotated in the opposite direction the potentiometer 374 produces a negative output again proportional to the extent of rotation. The output of the potentiometer 374 is utilized to effect steering and turning movements of vehicles incorporating undercarriages constructed in accordance with the third embodiment of the invention.

Figure 15:
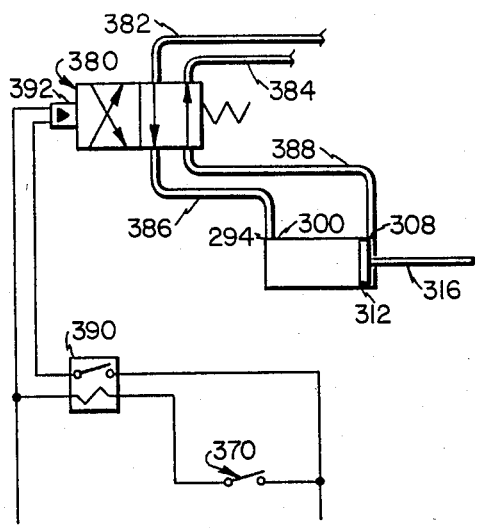
FIG. 15 is a schematic illustration of a control system utilizing the apparatus of FIGS. 13 and 14 showing the system in a first state.
Figure 16:
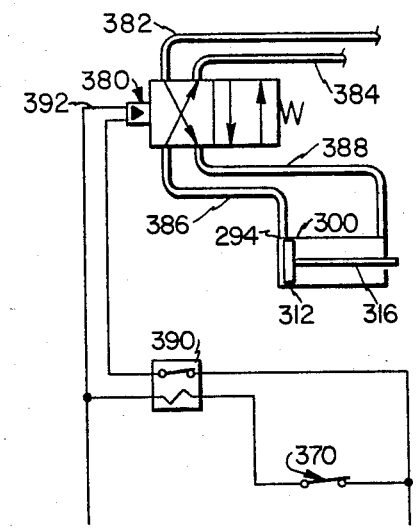
FIG. 16 is a view similar to FIG. 15 showing the system in a second state.

Referring to FIGS. 15 and 16, a system for controlling the operation of the hydraulic cylinders 300 of the spring/shock absorber/hydraulic cylinder assemblies 250 and thereby controlling the positioning of the wheels of a vehicle equipped with undercarriages incorporating the third embodiment of the invention under the action of the mechanism shown in FIGS. 13 and 14 is illustrated. A two position, four-way valve 380 is adapted for solenoid actuation and spring return. A line 382 extends from a source of pressurized hydraulic fluid and line 384 functions as a return for spent hydraulic fluid. A line 386 extends from the four-way valve 380 to the port 294 of the hydraulic cylinder 300, and a line 388 extends from the four-way valve 380 to the port 308 thereof.

The proximity sensor 370 functions to control the flow of actuating current to the coil of a relay 390 which in turn controls the flow of actuating current to the solenoid actuator 392 of the four-way valve 380. Thus, whenever the proximity sensor 370 is in one of its two states the four-way valve 380 is actuated to direct pressurized hydraulic fluid to one end of the hydraulic cylinder 300, and whenever the proximity sensor 370 is in its opposite state the valve 380 is actuated to direct pressurized hydraulic fluid to the opposite end of the hydraulic cylinder 300.

Assume now that a particular vehicle equipped with undercarriages incorporating the third embodiment of the invention is normally operated with all of the wheels thereof in relatively raised orientations. In such instances the apparatus of FIGS. 13 and 14 and the system of FIGS. 15 and 16 function responsive to predetermined pivotal movement of the steering shaft to lower the center wheels of the vehicle thereby facilitating steering and turning movements. On the other hand, if a particular vehicle equipped with undercarriages incorporating the third embodiment of the invention is normally operated with all of the wheels thereof in relatively lowered orientations, the apparatus of FIGS. 13 and 14 and the system of FIGS. 15 and 16 is responsive to a predetermined rotation of the steering shaft to raise the endmost wheels of the vehicle, thereby facilitating steering or turning movements thereof.

Figure 17:
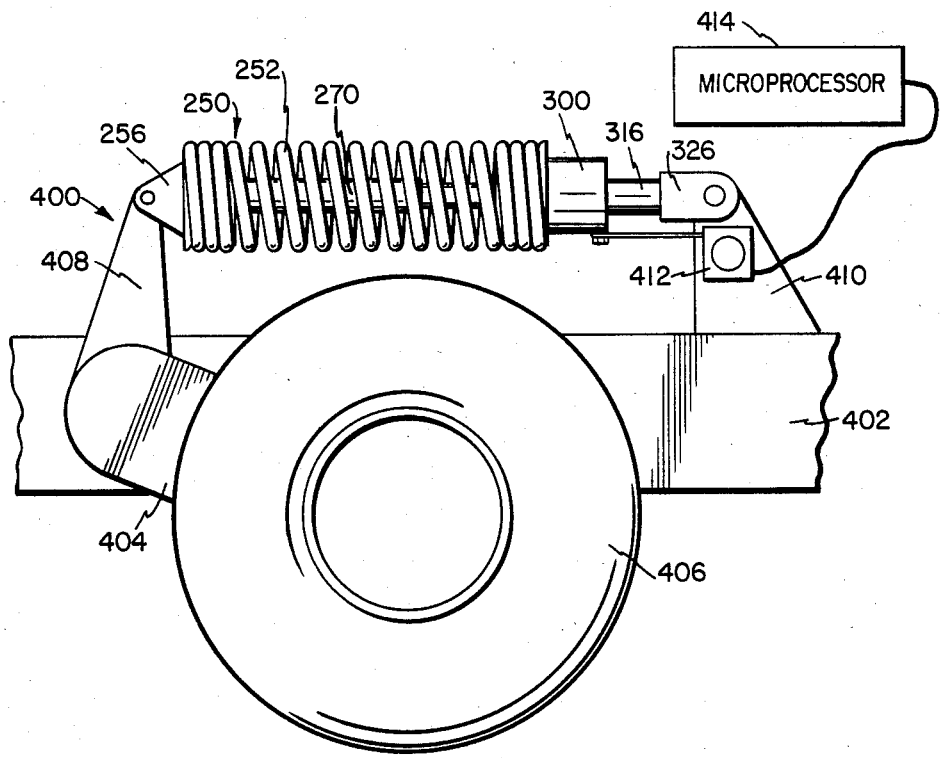
FIG. 17 is a partial side view of an undercarriage incorporating the third embodiment of the invention which utilizes a modification of the control system of FIGS. 15 and 16.
Figure 21:
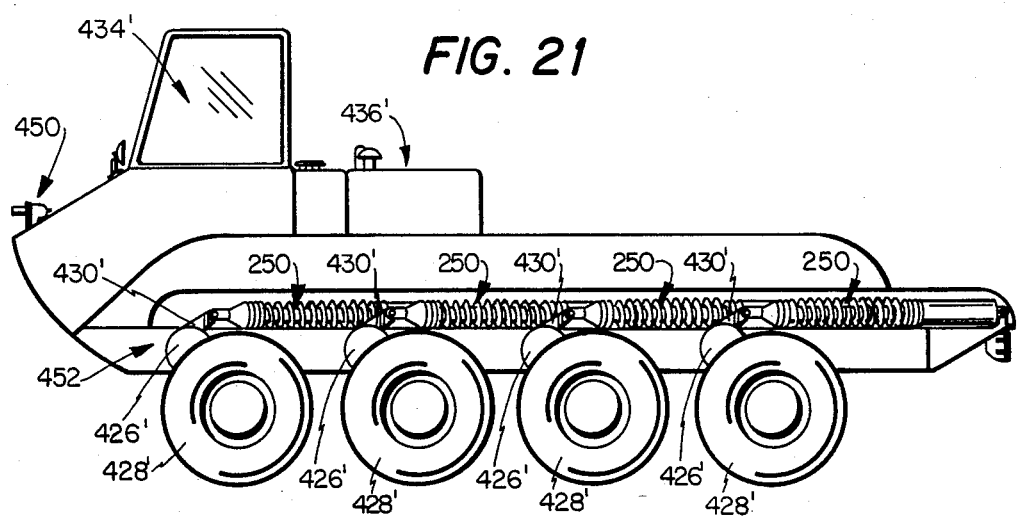
FIG. 21 is a side view of a vehicle similar to that of FIG. 18 having an undercarriage incorporating a second version of the third embodiment of the invention.
Figure 22:
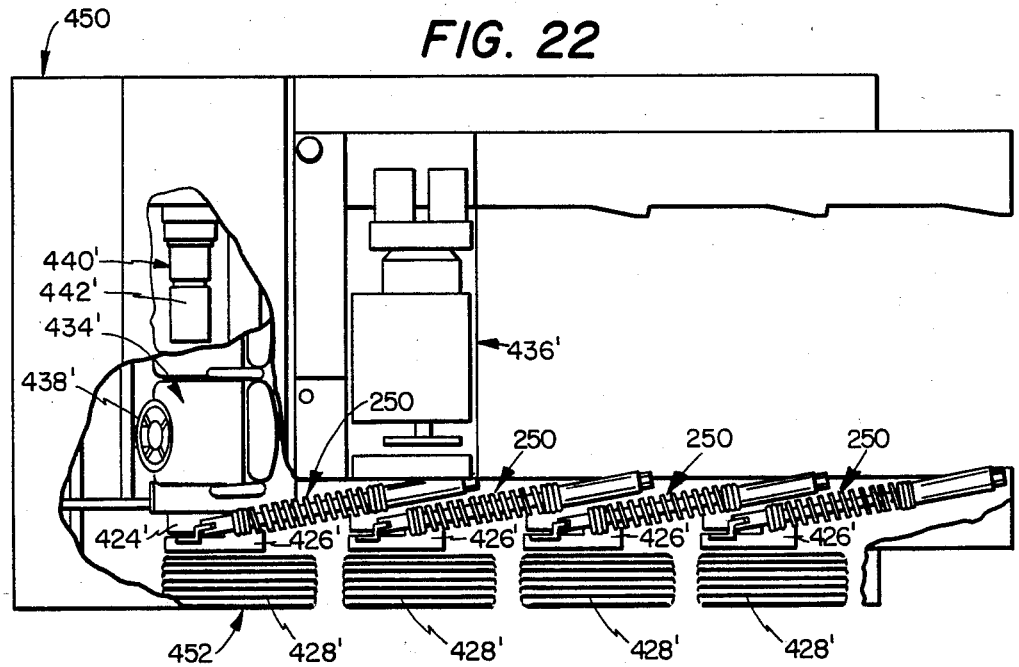
FIG. 22 is a top view of the vehicle of FIG. 21.
Figure 25:
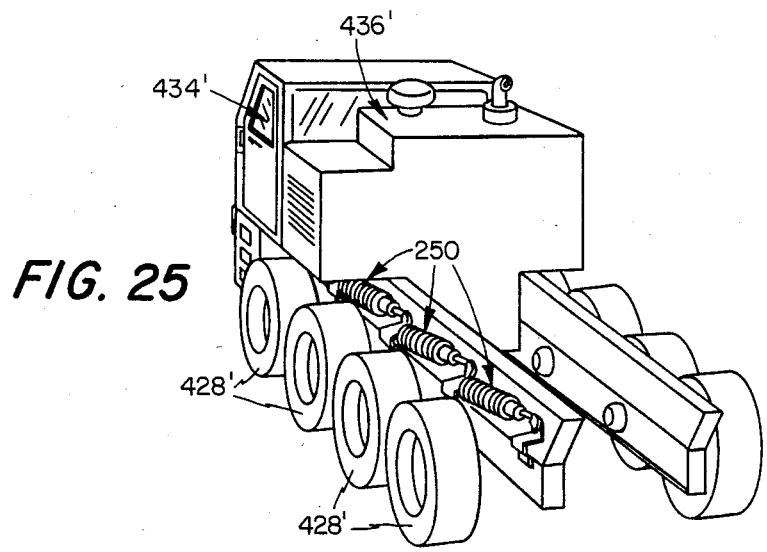
FIG. 25 is a rear perspective view of a vehicle similar to that shown in FIG. 18.

FIG. 17 illustrates a portion of an undercarriage 400 incorporating the third embodiment of the invention. A primary frame 402 extends longitudinally and has a primary transmission extending therethrough. A secondary frame 404 is pivotally supported on the primary frame 402 and in turn rotatably supports a wheel 406 at the distal end thereof. A secondary transmission extends through the secondary frame 404 and serves to operatively connect the primary transmission in the primary frame 402 to the wheel 406.

An arm 408 is connected to the secondary frame 404 and extends upwardly therefrom. An arm 410 is secured to the primary frame 402. A spring/shock absorber/hydraulic cylinder assembly 250 serves as a conventional automotive-type suspension for the wheel 406, that is, the spring 252 and the shock absorber 270 of the assembly 250 function with respect to the wheel 406 in the same manner that similar components function in conventional automotive applications. Additionally, by means of the hydraulic cylinder 300, the spring/shock absorber/hydraulic cylinder assembly 250 functions to control the positional relationship between the wheel 406 and the primary frame 402.

FIG. 17 further illustrates a modification of the system of FIGS. 15 and 16 which is useful in many applications of the invention. A transducer 412 is connected between the hydraulic cylinder 300 of the spring/shock absorber/hydraulic cylinder assembly 250 and the arm 410 connected to the primary frame 402. The transducer 412 produces an output indicative of the positioning of the wheel 406 relative to the primary frame 402. The output of the transducer 412 is connected to a microprocessor 414. The microprocessor 414 likewise receives signals indicative of the positioning of each of the wheels of a vehicle incorporating the undercarriage 400.

The microprocessor 414 is therefore adapted to perform a saftey function with respect to the operation of the vehicle. For example, if one or more of the wheels of the vehicle is not properly positioned to facilitate the safe execution of a particular maneuver, the microprocessor 414 can be used to override the instructions of the operator of the vehicle to either abort the attempted maneuver or effect proper positioning of the wheels of the vehicle to facilitate the safe execution thereof. The microprocessor 414 is further adapted to perform other safety fuctions such as prohibiting or limiting steering or turning maneuvers when the vehicle is operating at a high rate of speed, prohibiting or limiting turning maneuvers when the vehicle is improperly or too heavily loaded, automatically changing the orientation of the vehicle to compensate for the operation thereof on hillsides and similar inclined surfaces, etc.

Referring now to FIGS. 18, 19 and 20, there is shown a vehicle 420 equipped with undercarriages 422 constructed in accordance with a first version of the third embodiment of the invention. Each undercarriage 422 comprises an enlongate hllow load bearing primary frame 424 connected to the chassis of the vehicle 420 and having a primary transmission extending therethrough. A plurality of secondary frames 426 are pivotally supported on the primary frames 424 and in turn rotatably support wheels 428 at the distal ends thereof. Each secondary frame 426 has a secondary transmission extending therethrough which serves to drivingly connect the wheel 428 supported by the secondary frame 426 to the primary transmission extending through the associated primary frame 424.

The primary frames 424, the primary transmissions, the secondary frames 426, the secondary transmissions and the wheels 428 of the undercarriages 422 may be constructed substantially as shown in FIGS. 5 and 11.

Each secondary frame 426 has a bracket 430 secured thereto. A spring/shock absorber/hydraulic cylinder assembly 250 of the type shown in FIG. 12 is connected between each bracket 430 and a bracket 432 secured to the primary frame 424. In accordance with the first version of the third embodiment of the invention, the spring/shock absorber/hydraulic cylinder assemblies 250 are positioned in a vertical orientation and are located directly above the secondary frames 426. The use of the first version of the third embodiment of the invention is advantageous in those instances in which it is considered desirable to maximize the spacing between the undercarriages 422.

The vehicle 420 further includes an operator's compartment 434 and an engine 436. The engine 436 drives at least one hydraulic pump which functions as a source of pressurized hydraulic fluid for operating the undercarriages 422. The operator's compartment 434 includes a steering wheel 438 which is connected to a steering shaft 340 of the type shown in FIGS. 13 and 14. Upon actuation of the steering wheel 438 by the operator, the potentiometer 374 connected to the steering shaft 340 produces an output indicative of the direction and extent of rotation of the steering shaft 230.

Referring specifically to FIG. 19, each undercarriage 422 is provided with a drive system 440 including a hydraulic motor 42. When the steering shaft 340 is centered under the action of the torsion spring 356, pressurized hydraulic fluid from the hydraulic pump driven by the engine 436 flows equally to each hydraulic motor 442. When the steering wheel 438 is actuated by the operator and the steering shaft 340 is therefore rotated against the action of the torsion spring 356, the output of the potentiometer 374 is utilized to vary the flow of pressurized fluid to the hydraulic motors 442. Thus, the amount of pressurized hydraulic fluid directed to one of the hydraulic motors 442 is increased and the amount of pressurized fluid flowing to the other hydraulic motor 442 is reduced. In this manner the undercarriage 422 on one side of the vehicle is operated at a higher rate of speed than the undercarriage on the opposite side, whereby turning and steering movements of the vehicle 420 are effected.

The vehicle 420 carries a radar unit 444 including a radar dome 446. A housing 448 encloses all of the electronics and other apparatus comprising the radar unit 444. The housing 448 also serves as a work area for the technicians that operate the radar unit 444. Access to the housing 448 is provided through a rear door 449 thereof.

A vehicle 450 including undercarriages 452 constructed in accordance with a second version of the third embodiment of the invention is illustrated in FIGS. 21–26, inclusive. Many of the component parts of the vehicle 450 are substantially identical in construction and function to component parts of the vehicle 420 illustrated in FIGS. 18, 19 and 20 and described hereinabove in conjunction therewith. Such identical component parts are designated in FIGS. 21–26 with the same reference numerals utilized in the description of the vehicle 420, but are differentiated therefrom by means of a prime (') designation.

The primary distinction between the first version of the third embodiment of the invention as illustrated in FIGS. 18, 19 and 20 and the second version of the third embodiment of the invention as illustrated in FIGS. 21-26 comprises the fact that in accordance with the second version, the spring/shock absorber/hydraulic cylinder assemblies are oriented in a horizontal plane. The use of the second version of the third embodiment of the invention is advantageous in those instances in which it is desirable to minimize the height of an undercarriage constructed in accordance with the third embodiment of the invention.

Figure 26:
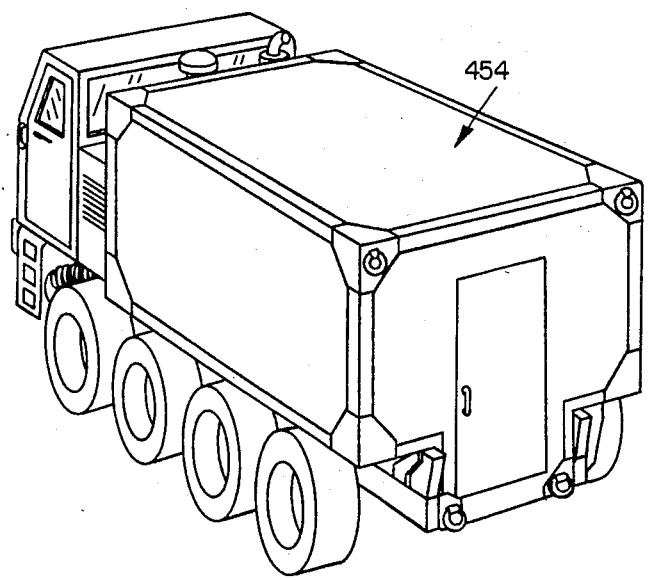
FIG. 26 is a view similar to FIG. 25 showing a container mounted on the vehicle.

FIGS. 21, 24, 25 and 26 show the vehicle 450 with the secondary frames 426' and the wheels 428' positioned normally. FIG. 26 illustrates the vehicle 450 utilized to carry a housing 454. The housing 454 may be utilized to enclose any desired type of apparatus or cargo.

Referring to FIG. 23, the hydraulic cylinders of the spring/shock absorber/hydraulic cylinder assembly 250 may be actuated simultaneously to substantially lower the chassis of the vehicle 450. This allows the vehicle 450 to either receive or release the housing 454 without requiring the assistance of other apparatus. The function illustrated in FIG. 23 with respect to the vehicle 450 may also be performed by the vehicle 420 illustrated in FIGS. 18, 19 and 20.

Figure 27:
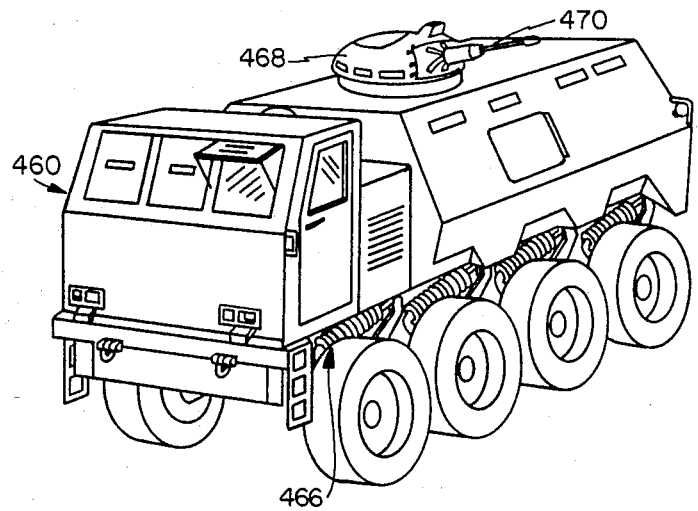
FIGS. 27, 28 and 29 are perspective views of armored personnel carriers incorporating the third embodiment of the invention.
Figure 28:
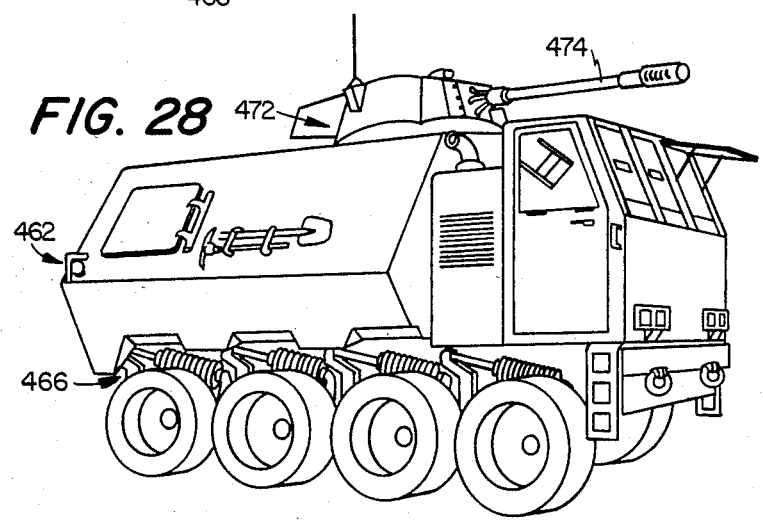
Figure 29:
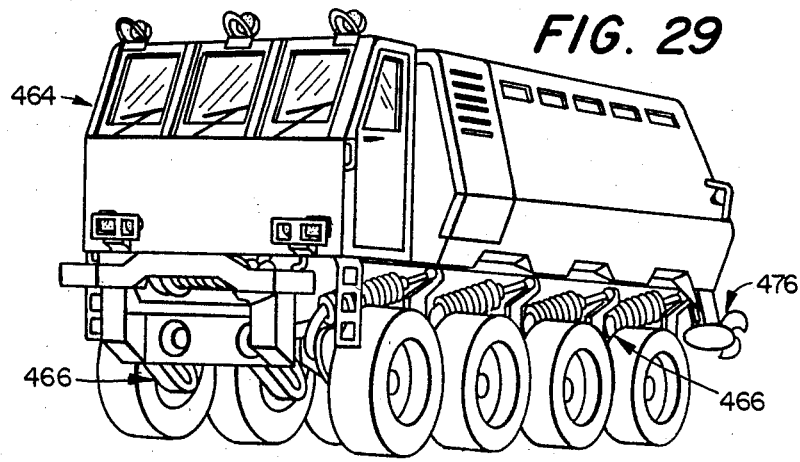

FIGS. 27, 28 and 29 illustrate armored personnel carriers 460, 462 and 464, respectively, each provided with undercarriage 466 constructed in accordance with the third embodiment of the invention. The armored personnel carrier 460 is provided with a turret 468 including a machine gun 470. The armored personnel carrier 462 is provided with a turret 472 which includes a cannon 474. The armored personnel carrier 464 is an amphibious vehicle and is provided with apparatus 476 for propelling the vehicle 464 during operation in rivers, lakes, etc.

Figure 30:
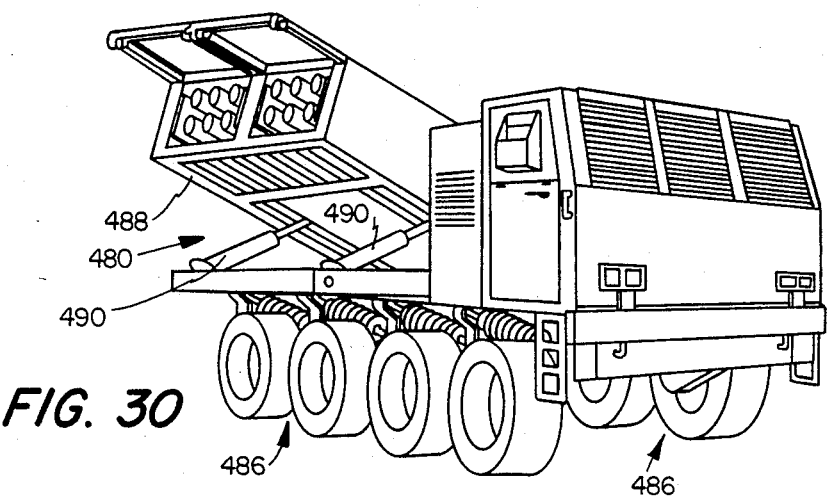
FIGS. 30 and 31 are perspective views of weapons systems incorporating the third embodiment of the invention.
Figure 31:
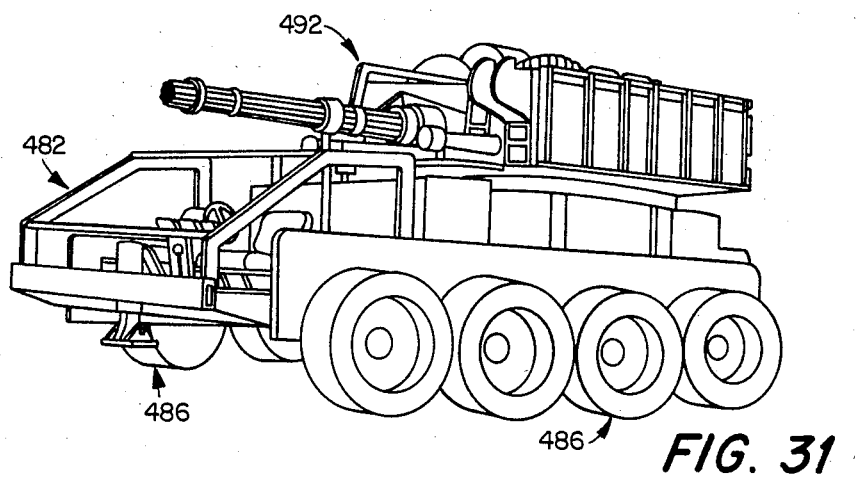
Figure 32:
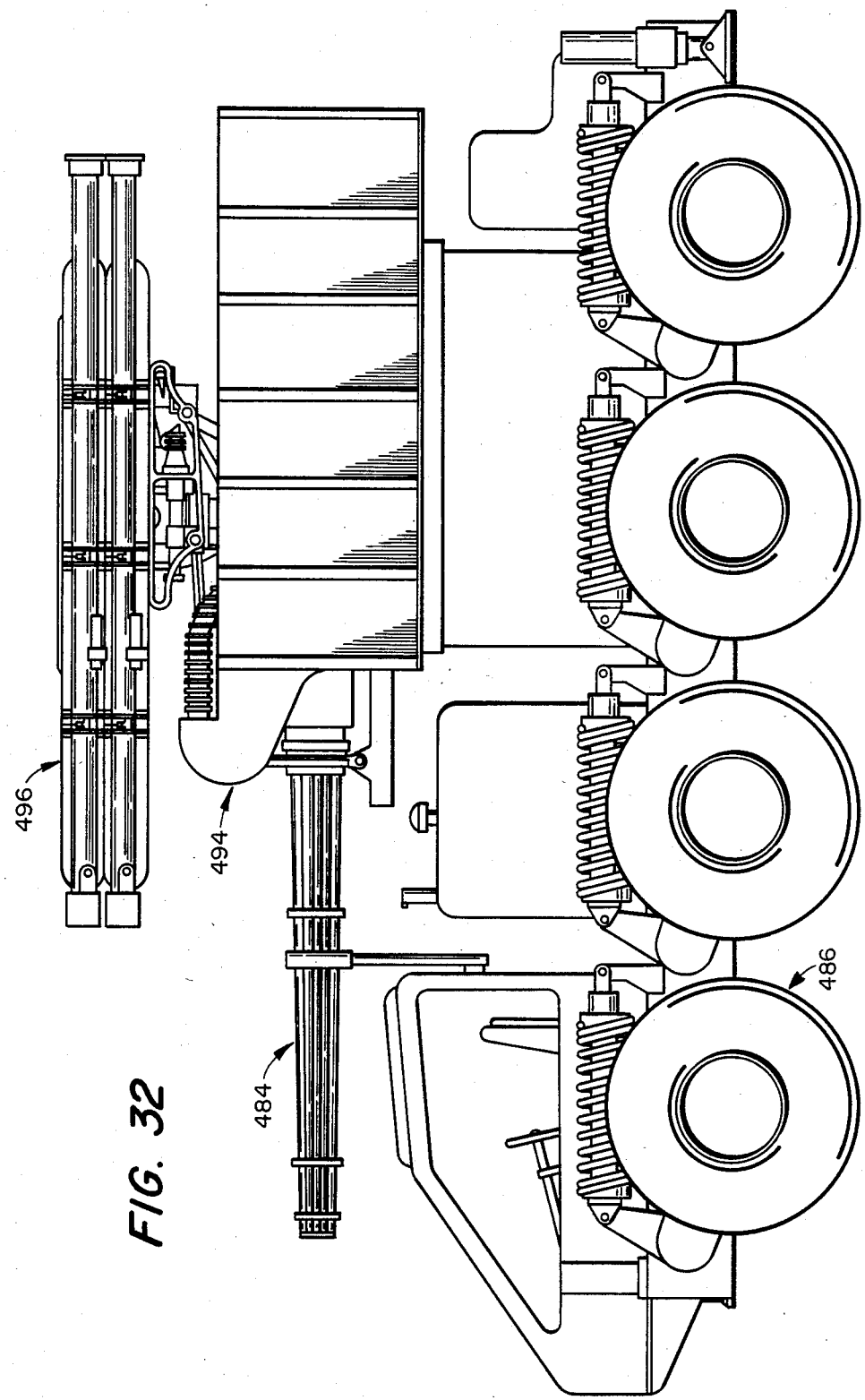
FIG. 32 is a side view of a weapons system incorporating the third embodiment of the invention.

FIGS. 30, 31 and 32 illustrate weapons systems 480, 482 and 484 each equipped with undercarriages 486 constructed in accordance with the third embodiment of the invention. The weapons system 480 is a rocket launcher and comprises a plurality of rocket launching tubes mounted in a housing 488 which is positionable by fluid powered cylinders 490. The weapons system 482 comprises a Vulcan gun 492 mounted on a vehicle equipped with the undercarriages 486. The weapons system 484 comprises both a Vulcan gun 494 and a rocket launcher 496.

Figure 33:
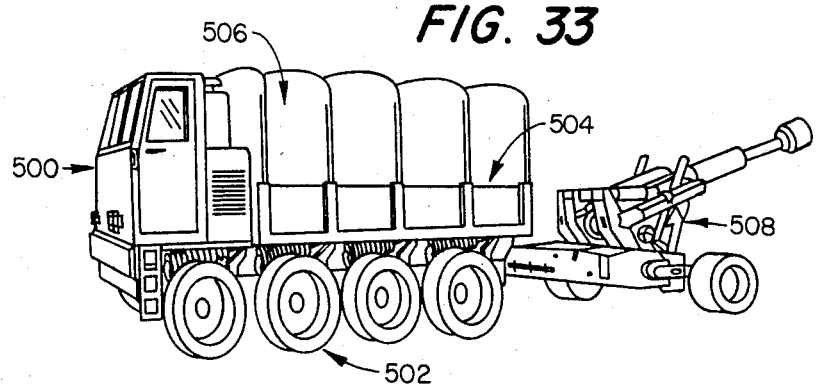
FIG. 33 is a perspective view of a military truck incorporating the third embodiment of the invention.

In FIG. 33 there is shown a truck 500 equipped with undercarriages 502 constructed in accordance with the third embodiment of the invention. The truck 500 includes a bed 504 which may be provided with a fabric covering 506, if desired. The truck 500 may be used to transport personnel, various types of cargo, etc. The truck 500 may also be used to tow various types of military apparatus, such as the howitzer 508 shown in FIG. 33.

Figure 34:
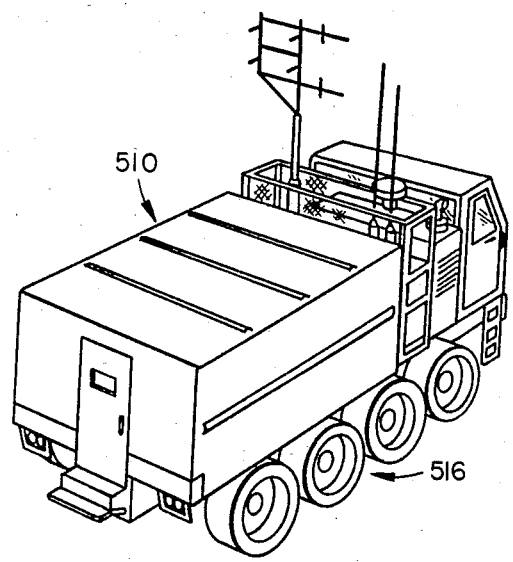
FIG. 34 is a perspective view of a communications system incorporating the third embodiment of the invention.
Figure 35:
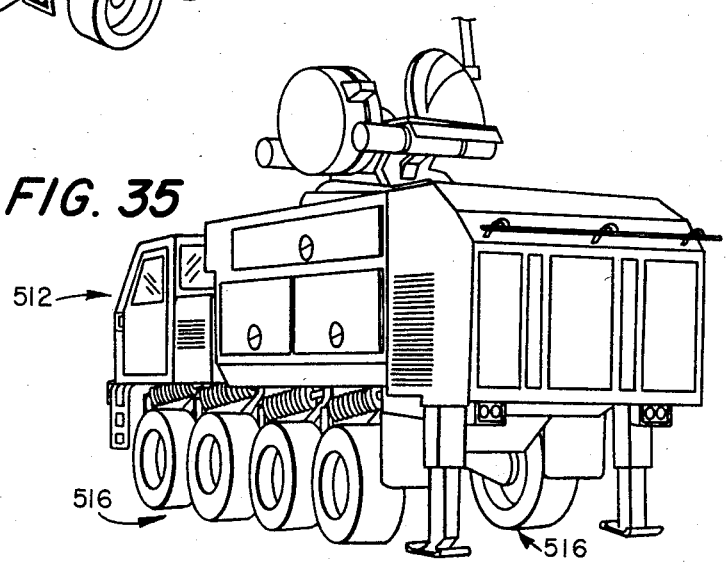
FIG. 35 is a perspective view of a radar system incorporating the third embodiment of the invention.

FIGS. 34, 35 and 36 illustrate various military-type vehicles 510, 512 and 514 each equipped with undercarriages 516 constructed in accordance with the third embodiment of the invention. Vehicle 510 is a communications unit. Vehicle 512 is an electronic surveilence unit. Vehicle 514 is a fuel transportation truck.

FIGS. 37–56 illustrate vehicles having both civilian and military applications. In FIG. 37 there is shown an excavator 520 equipped with undercarriges 522 constructed in accordance with the third embodiment of the invention. The excavator 520 is equipped with a back hoe 524 and a front end loader 526.

FIG. 38 illustrates a truck 530 equipped with undercarriages 532 constructed in accordance with the third embodiment of the invention. The truck 530 has a bed 534 and is provided with a fork lift apparatus 536 at the front end thereof. FIG. 39 illustrates a dump truck 538 provided with undercarriages 540 constructed in accordance with the third embodiment of the invention. In FIG. 40 there is shown an ambulance 542 supported on undercarriages 544 constructed in accordance with the third embodiment of the invention.

Figure 42:
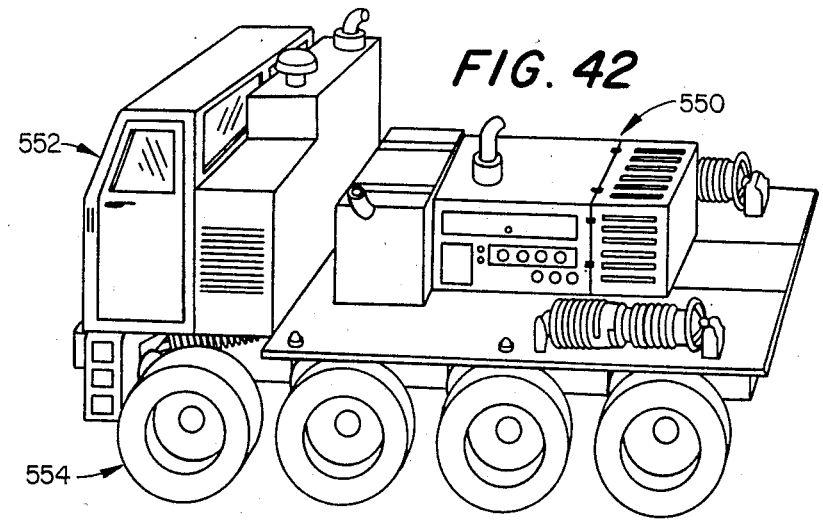
FIG. 42 is a perspective view of an electrical generator vehicle incorporating the third embodiment of the invention.
Figure 43:
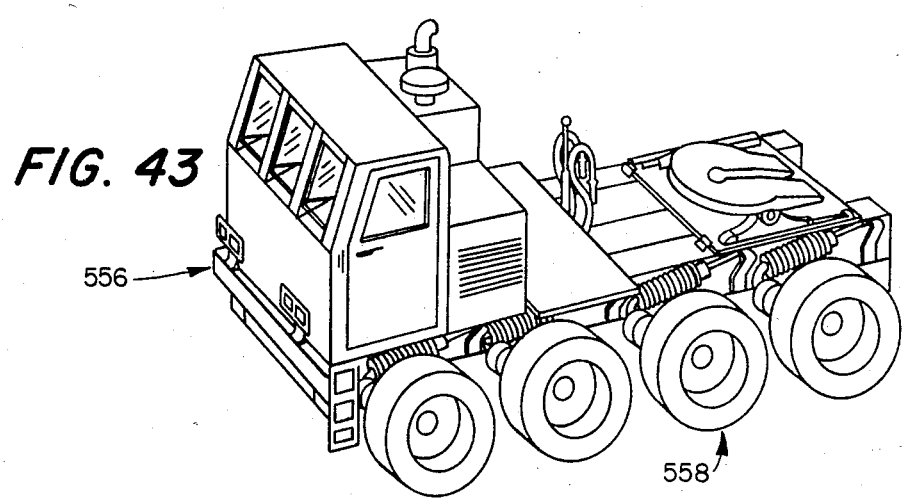
FIG. 43 is a perspective view of an all terrain tractor of the type utilized to pull semi-trailers which incorporates the third embodiment of the invention.
Figure 44:
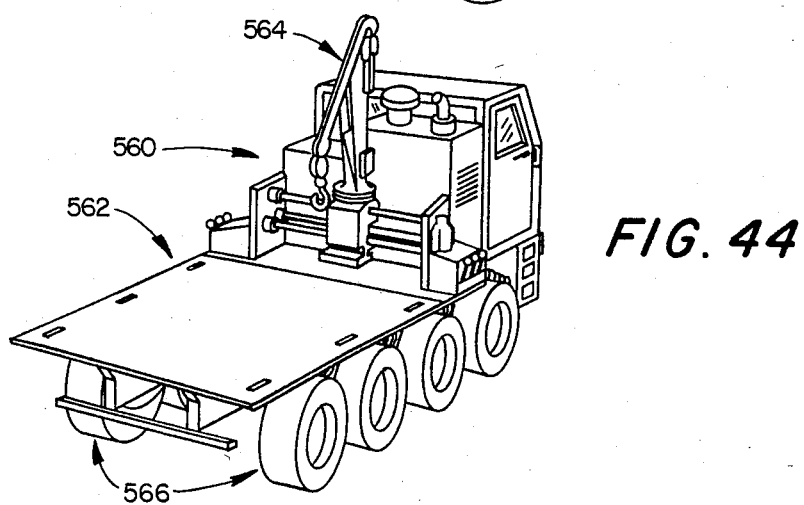
FIG. 44 is a perspective view of a crane truck which incorporates the third embodiment of the invention.

FIG. 41 shows a wrecker 546 equipped with undercarriages 548 constructed in accordance with the third embodiment of the invention. FIG. 42 is an illustration of an electrical generator 550 mounted on a truck 552 equipped with undercarriages 554 constructed in accordance with the third embodiment of the invention. In FIG. 43 there is shown a tractor 556 of the type utilized to pull semi-trailers and the like which is equipped with undercarriages 558 constructed in accordance with the third embodiment of the invention. In FIG. 44 there is shown a truck 560 having a flat bed 562 and equipped with a crane 564. The truck 560 is provided with undercarriages 566 constructed in accordance with the third embodiment of the invention.

Figure 45:
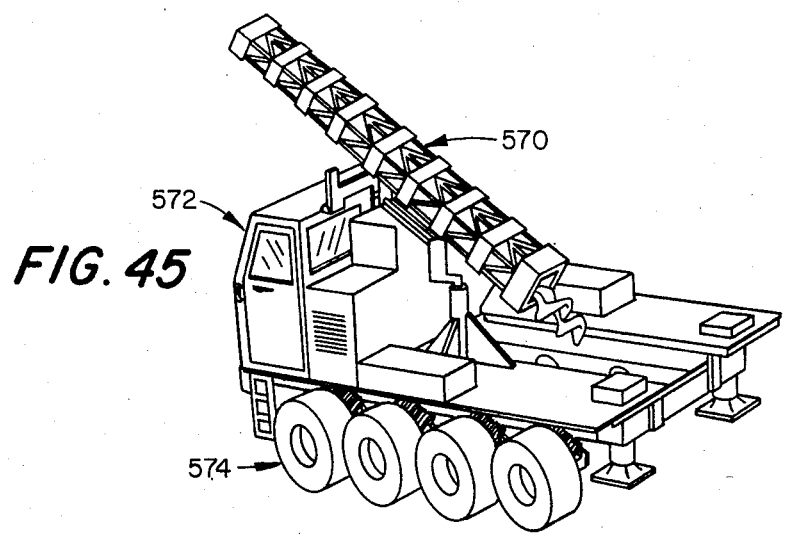
FIG. 45 is a perspective view of a drilling rig which incorporates the third embodiment of the invention.
Figure 46:
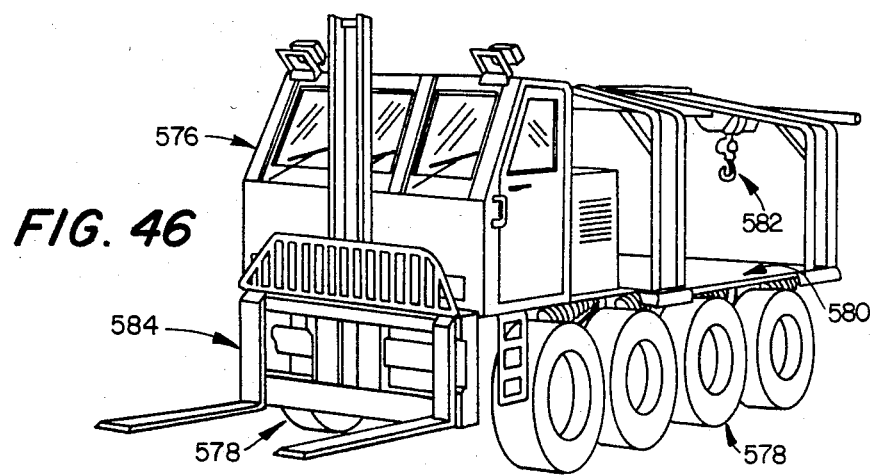
FIG. 46 is a perspective view of a cargo handling truck which incorporates the third embodiment of the invention.
Figure 47:
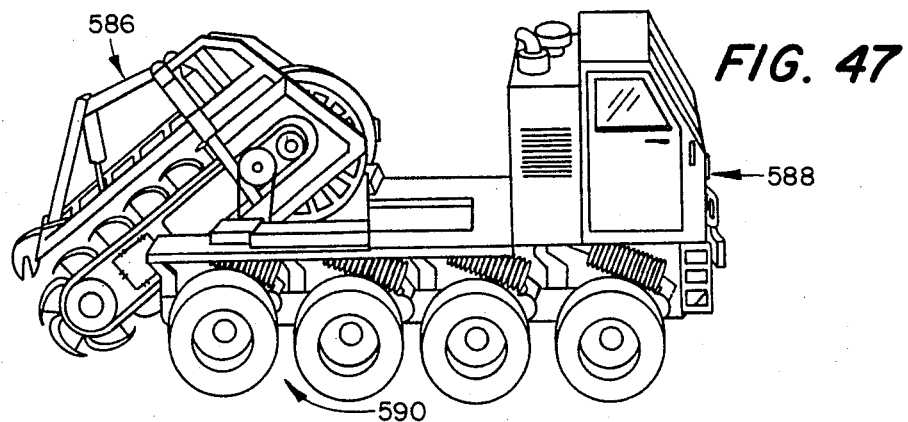
FIG. 47 is a side view of a trenching vehicle which incorporates the third embodiment of the invention.

In FIG. 45 a drilling rig 570 is shown mounted on a truck 572 equipped with undercarriages 574 constructed in accordance with the third embodiment of the invention. In FIG. 46 a truck 576 is provided with undercarriages 578 constructed in accordance with the third embodiment of the invention. The truck 576 has a flat bed 580 and is equipped with a hoist 582 and a fork lift apparatus 584. In FIG. 47 there is shown a trenching machine 586 mounted on a truck 588 having undercarriages 590 constructed in accordance with the third embodiment of the invention.

Figure 48:
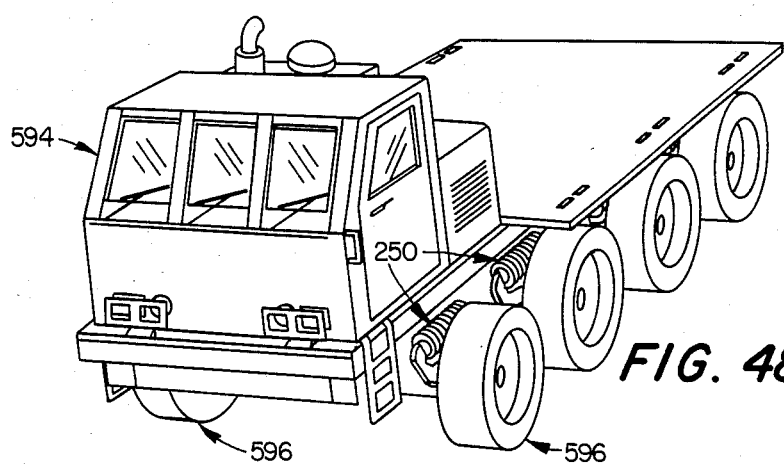
FIG. 48 is a perspective view of a flat bed truck which incorporates the third embodiment of the invention.
Figure 49:
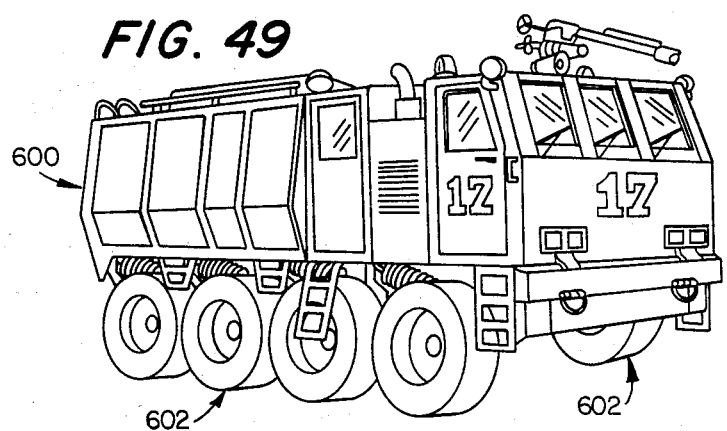
FIG. 49 is a perspective view of a fire truck which incorporates the third embodiment of the invention.
Figure 50:
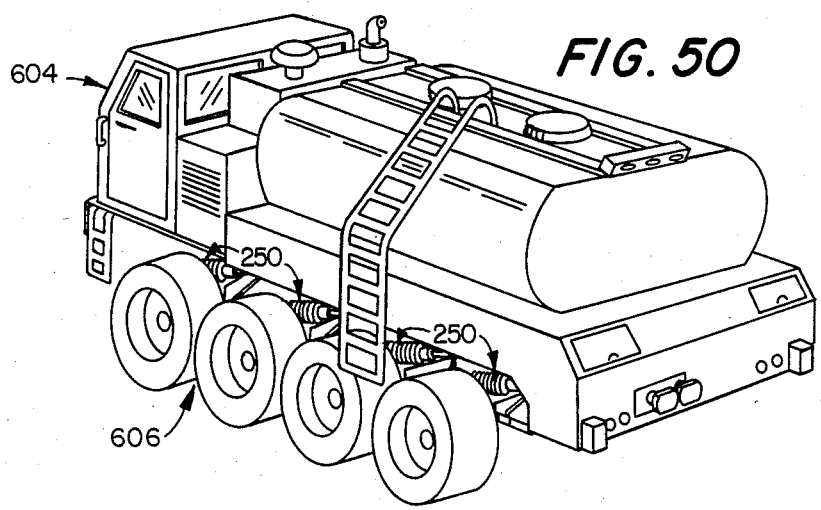
FIG. 50 is a perspective view of a tank truck which incorporates the third embodiment of the invention.

A flat bed truck 594 having undercarriages 596 constructed in accordance with the third embodiment of the invention is illustrated in FIG. 48. A fire truck 600 having undercarriages 602 constructed in accordance with the third embodiment of the invention is shown in FIG. 49. FIG. 50 illustrates a tank truck 604 having undercarriages 606 constructed in accordance with the third embodiment of the invention.

Figure 51:
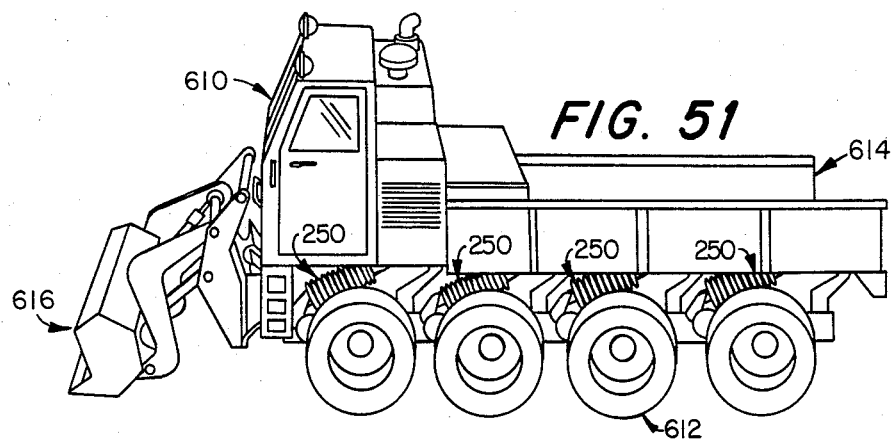
FIG. 51 is a side view of a truck incorporating the third embodiment of the invention which is provided with excavating apparatus.
Figure 52:
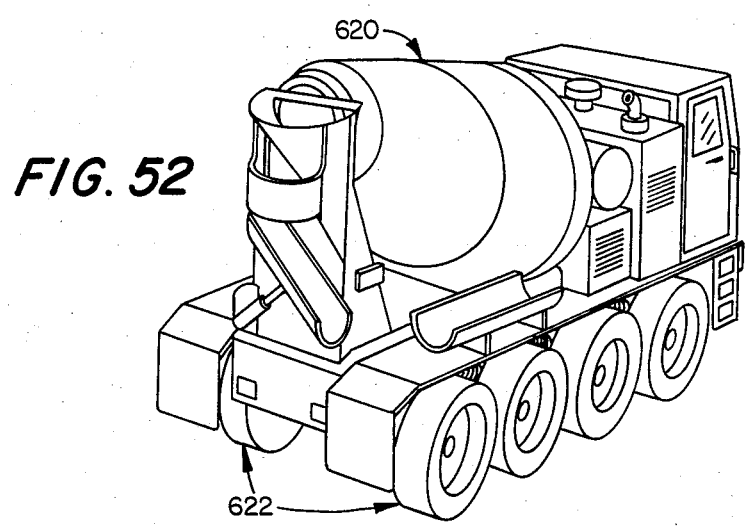
FIG. 52 is a perspective view of a ready-mix concrete truck which incorporates the third embodiment of the invention.
Figure 53:
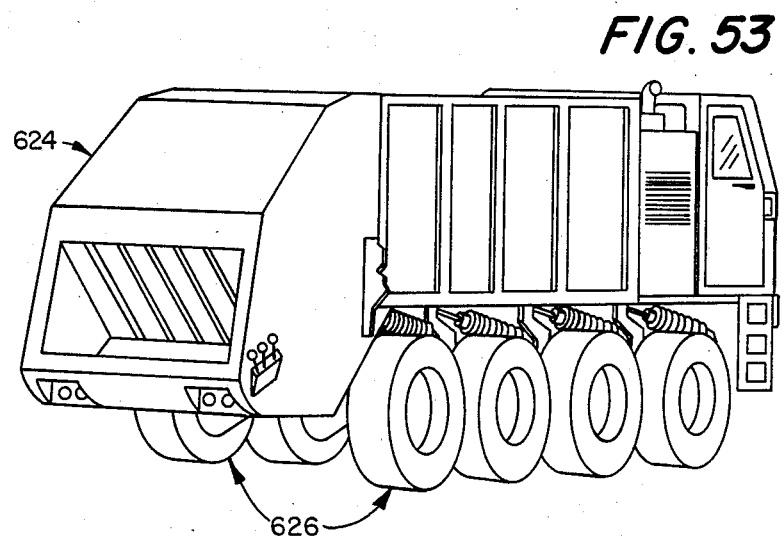
FIG. 53 is a perspective view of a refuse truck which incorporates the third embodiment of the invention.

In FIG. 51 there is shown a truck 610 equipped with undercarriages 612 constructed in accordance with the third embodiment of the invention. The truck 610 has a bed 614 and is equipped with a front end loader 616. In FIG. 52 there is shown a ready-mix concrete truck 620 equipped with undercarriages 622 constructed in accordance with the third embodiment of the invention. A refuse truck 624 having undercarriages 626 constructed in accordance with the third embodiment of the invention is illustrated in FIG. 53.

Figure 54:
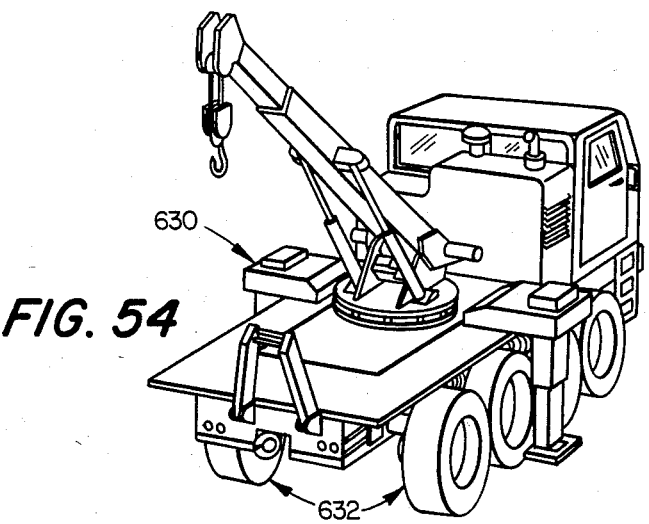
FIG. 54 is a perspective view of a crane truck which incorporates the third embodiment of the invention.
Figure 55:
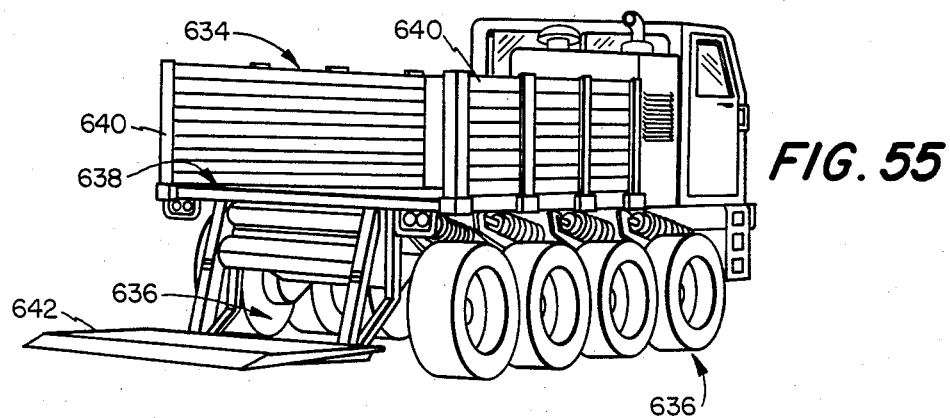
FIG. 55 is a perspective view of a truck incorporating the third embodiment of the invention which is provided with article lifting apparatus.
Figure 56:
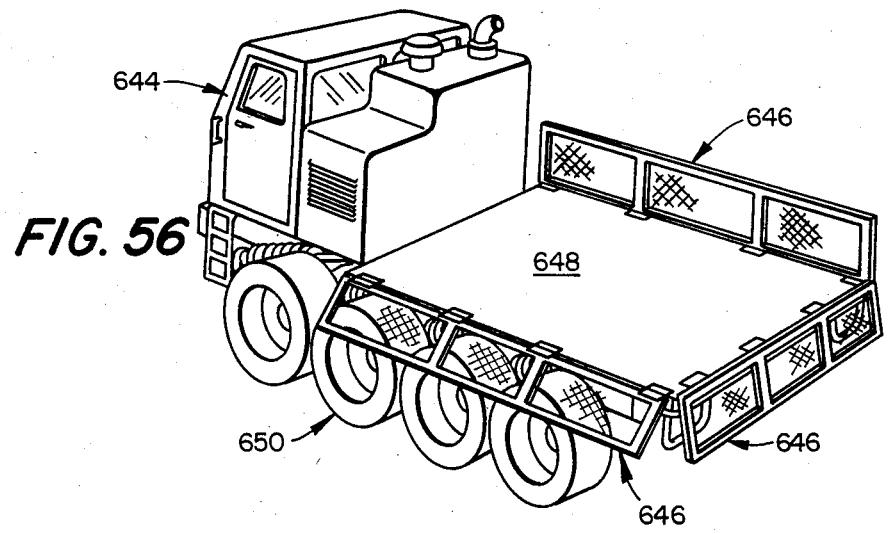
FIG. 56 is a perspective view of a flat bed truck having pivotally mounted side walls which incorporates the third embodiment of the invention.

FIG. 54 shows a crane truck 630 equipped with undercarriages 632 constructed in accordance with the third embodiment of the invention. FIG. 55 shows a truck 634 having undercarriages 636 constructed in accordance with the third embodiment of the invention. The truck 634 is provided with a bed 638 having removable side walls 640, and is provided with a cargo lifting apparatus 642. In FIG. 56 there is shown a truck 644 having pivotally supported side and end walls 646 surrounding a bed 648. The truck 644 is provided with undercarriages 650 constructed in accordance with the third embodiment of the invention.

Figure 57:
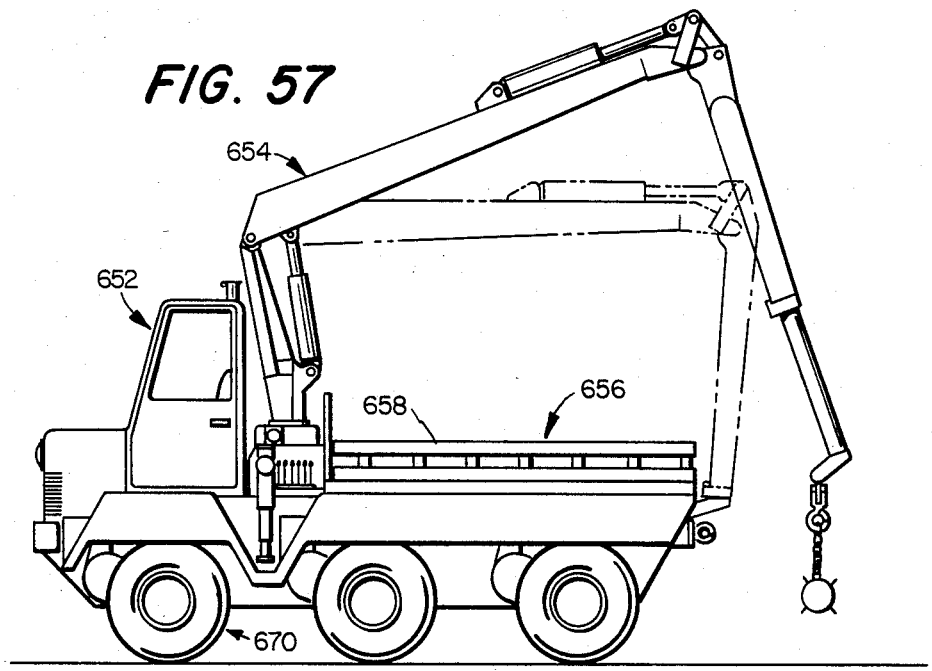
FIGS. 57 and 58 are side and top views, respectively of a crane truck which incorporates the third embodiment of the invention.
Figure 58:
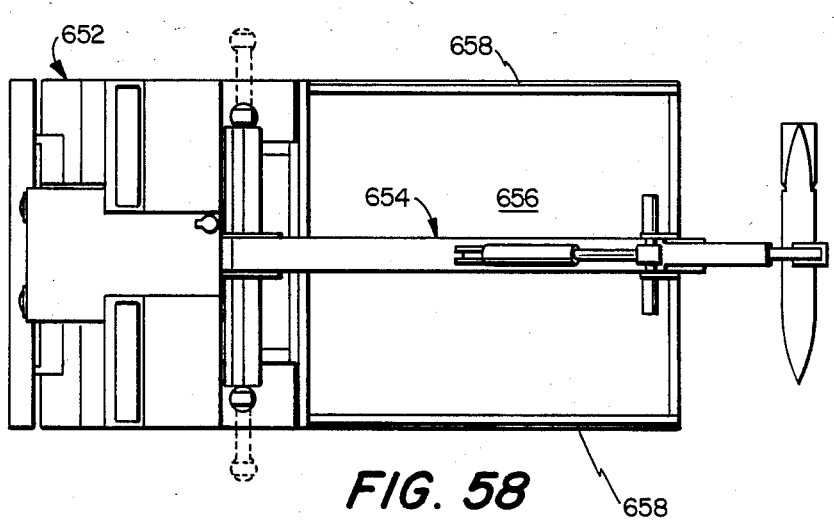

In FIGS. 57 and 58 there is shown a truck 652 equipped with a long reach boom 654 adapted to receive articles from the adjacent surface, to position articles on a bed 656 surrounded by side walls 658, and to subsequently remove articles from the bed 656. The truck 652 is provided with undercarriages 670 constructed in accordance with the third embodiment of the invention.

Figure 59:
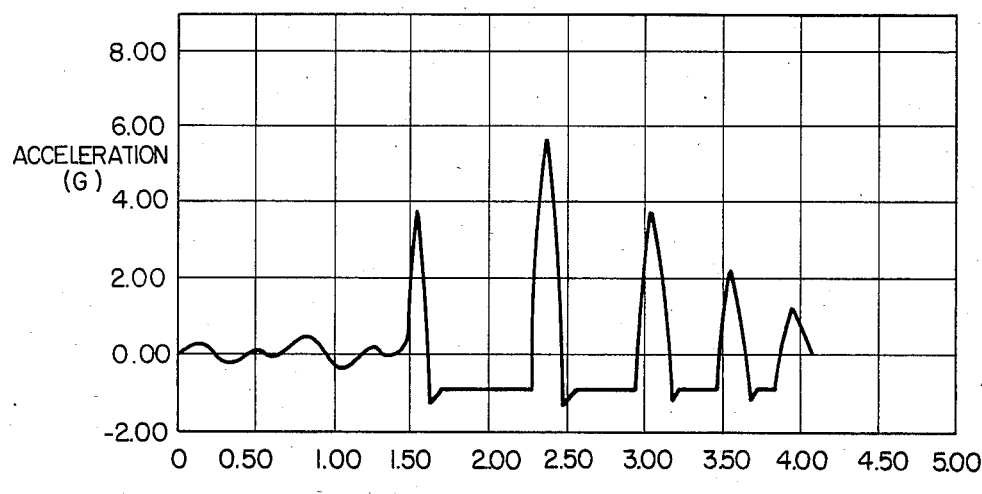
FIGS. 59, 60, 61 and 62 are charts illustrating the advantages derived from the use of the invention.
Figure 60:
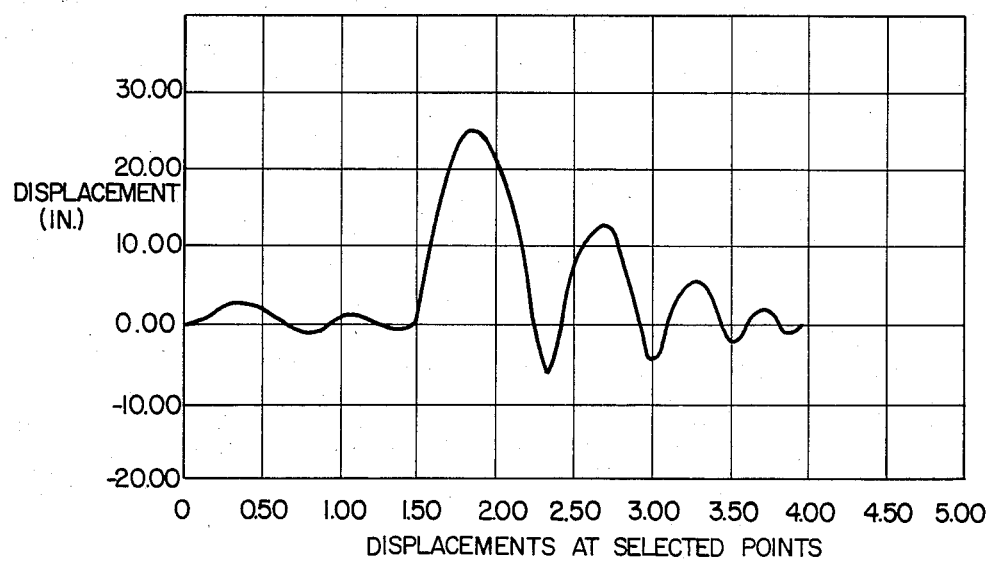
Figure 61:
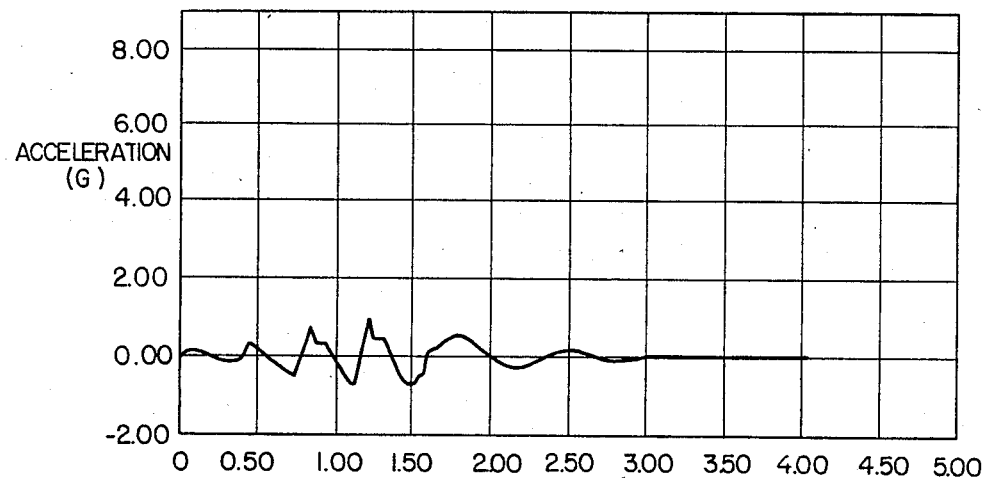
Figure 62:
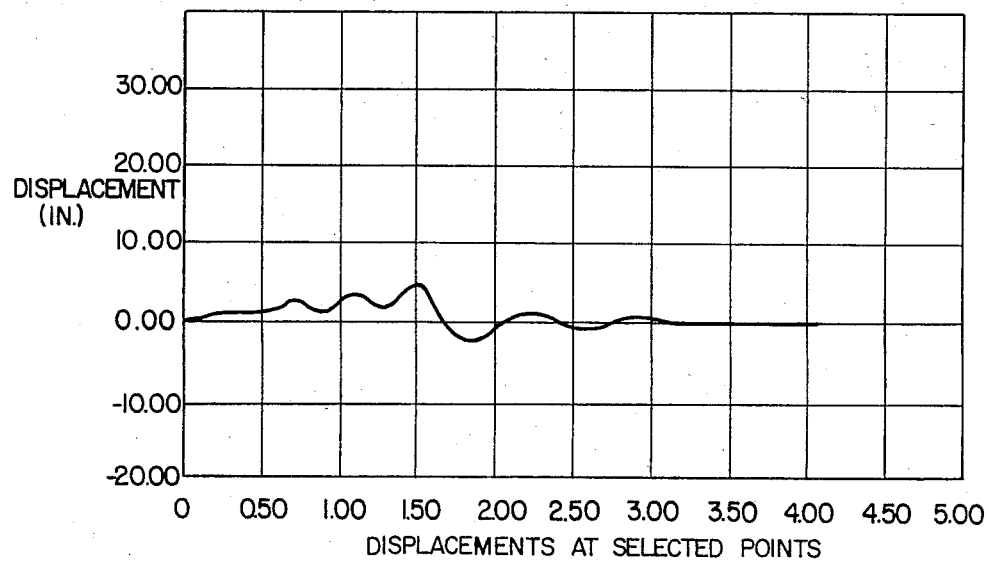

FIGS. 59, 60, 61 and 62 are mathematically generated charts illustrating the advantages deriving from the present invention. In FIG. 59 it is shown that a load carried by a four wheel vehicle having a conventional suspension experiences an acceleration of approximately 6 g's when the vehicle strikes a bump having a height of 10 inches at a speed of 7 m.p.h. The resulting deflection of the load carried by such a vehicle is illustrated in FIG. 60 to be approximately 25 inches. In FIG. 61 the acceleration experienced by a load carried by a vehicle constructed in accordance with the present invention is shown to be approximately 1 g as a result of the same occurance. In FIG. 62 the deflection experienced by such a load is shown to be less than 5 inches.

Military equipment incorporating undercarriages of the present invention is adapted for deployment over long distances at high speeds. Because of the extremely smooth ride that is afforded by equipment incorporating the invention, such high speed operation involves minimum occupant discomfort. Upon arrival at the point of conflict such equipment is adapted for operation over various types of adverse terrain, including barricades, rubble resulting from burned or bombed out buildings, bomb craters, and the like without undue discomfort to occupants thereof. One particular advantage derived from the use of the invention relates to the pivotally supported secondary frames, whereby the wheels are adapted to "step" over small obstacles and trenches with virtually no discomfort to occupants of the equipment. Another advantage involves the fact that equipment incorporating the invention typically has superior flotation when compared with conventional equipment.

It will thus be understood that the undercarriage of the present invention provides numerous improvements over the prior art, particularly when utilized in conjunction with military equipment. Thus, by means of the invention the advantages normally associated with a relatively long wheel base vehicle are fully provided. These include increased stability, increased traction and increased occupant comfort. At the same time, the advantages with respect to reduce skid steering effort that are normally associated with a short wheel base vehicle are fully realized.

Although particular embodiments of the invention have been illustrated in the accompanying Drawings and described in the foregoing Detailed Description, it will be understood that the invention is not limited to the embodiments disclosed, but is capable of numerous rearrangements, modifications, and substitutions of parts and elements without departing from the spirit of the invention.

We claim:

1. An undercarriage comprising:
an elongated hollow load bearing primary frame;
at least three secondary frames;
means supporting the secondary frames at longitudinally spaced points on the primary frame for pivotal movement with respect thereto;
at least three primary axles having a first portion positioned within the primary frame and a second portion positioned within one of the secondary frames;
means supporting each of the primary axles for rotation both with respect to the primary frame and with respect to its associated secondary frame;
primary transmission means positioned within the primary frame for drivingly interconnecting at least two of the primary axles;
drive means operably connected to the primary transmission means for actuation thereof whereby the drive means and the primary transmission means effect concurrent rotation of the interconnected primary axles;
a plurality of secondary axles each individual to one of the secondary frames and each having a wheel receiving member at one end thereof;
at least three wheel members each mounted on and secured to the wheel receiving end of one of the secondary axles;
means rotatably supporting the secondary axles in the secondary frames with each of the secondary axles extending out of its secondary frame and being rotatably supported in at least one side of its secondary frame;
at least two secondary transmission means each mounted in one of the secondary frames and each drivingly interconnecting one of the primary axles and its associated secondary axle; and
a spring and hydraulic cylinder assembly connected between each of the secondary frames and the primary frame for controlling and limiting pivotal movement of the secondary frames relative to the primary frame, for selectively positioning the wheel member mounted on the secondary frames to facilitate skid steering, for selectively positioning the wheel members mounted on the secondary frames to facilitate high speed operation, and for vertically extending and retracting all of the wheel members relative to the primary frame to facilitate operation when loaded and unloaded and to vertically position the undercarriage with respect to an underlying surface.

2. The undercarriage according to claim 1 wherein the primary transmission means comprises sprockets mounted on at least two of the primary axles and a drive chain drivingly interconnecting the sprockets.

3. The undercarriage according to claim 1 wherein the drive means comprises a hydrostatic drive motor and speed reducing means.

4. The undercarriage according to claim 1 wherein each of the secondary frames extends angularly downwardly from the primary frame towards the underlying surface.

5. The undercarriage according to claim 1 wherein each of the secondary transmission means comprises a sprocket mounted on one of the primary axles, a sprocket mounted on the associated secondary axle and a drive chain drivingly interconnecting the sprockets on the primary and secondary axles.

6. The undercarriage according to claim 1 wherein each of the secondary frames includes brake means for selective actuation to arrest the movement of the wheel member carried by the secondary axle of the secondary frame.

7. The undercarriage according to claim 1 wherein each of the secondary frames is hollow and entirely encloses its associated secondary transmission means, wherein all of the secondary frames are positioned on the same side of the primary frame, wherein each of the secondary frames extends angularly downwardly from the primary frame toward the underlying surface, wherein each of the secondary transmission means comprises a sprocket mounted on one of the primary axles, a sprocket mounted on the associated secondary axle, and a drive chain drivingly interconnecting the two sprockets, and wherein each of the secondary frames includes brake means for selectively arresting rotation of the wheel member mounted on the associated secondary axle.

8. In an undercarriage of the type including an elongate hollow load bearing primary frame a plurality of primary axles positioned at axially spaced points along the primary frame for supporting the primary axles for rotation with respect thereto, transmission means mounted within the primary frame for drivingly interconnecting at least two of the primary axles, and drive means mounted on the primary frame and drivingly connected to the transmission means for cooperation therewith to drive the interconnected primary axles, the improvement comprising:

a plurality of secondary frames each individual to one of the primary axles;

means supporting each of the secondary frames for pivotal movement relative to the primary frames about an axis which is coincident with the axis of rotation of its associated primary axle;

a plurality of secondary axles each individual to one of the primary axles;

means mounted on the secondary frames for supporting the secondary axles for rotation about axes extending parallel to the axes of rotation of the primary axles;

secondary means mounted within the secondary axles for drivingly interconnecting each primary axle and the secondary axle individual thereto;

a shock absorber connected between each of the secondary frames and the primary frame for controlling the pivotal movement of the secondary frame relative thereto;

a spring connected between each of the secondary frames and the primary frame for controlling the pivotal movement of the secondary frame relative thereto; and a double acting hydraulic cylinder connected between each of the secondary frames and the primary frame for selectively positioning the axles of the secondary frames to facilitate skid steering of the undercarriage, for selectively positioning the axles of the secondary frames to facilitate high speed operation of the undercarriage, and for vertically extending and retracting all of the wheel members relative to the primary frame to facilitate operation when loaded and unloaded and to vertically position the undercarriage with respect to an underlying surface.

9. The improvement according to claim 8 wherein each secondary transmission means comprises a sprocket mounted on one of the primary axles, a sprocket mounted on the corresponding secondary axle and a drive chain drivingly interconnecting the two sprockets.

10. The improvement according to claim 8 wherein each of the secondary frames further includes brake means for selective actuation to arrest the rotation of the secondary axle carried by the secondary frame.

11. The improvement according to claim 8 wherein the springs urge the secondary frames to pivot away from the primary frame.

12. The improvement according to claim 8 wherein the spring and the shock absorber connected to each secondary frame includes connecting means for connecting both the spring and the shock absorber to the primary frame and to the secondary frame.

13. An undercarriage comprising:

an elongated hollow load bearing primary frame;

a plurality of elongate hollow secondary frames;

means supporting the secondary frames at longitudinally spaced points along the primary frame for pivotal movement with respect thereto with the secondary frames normally extending angularly downwardly from the primary frame and substantially parallel to one another;

a plurality of primary axles each individual to one of the secondary frames;

means supporting the primary axles for rotation about axes coincident with the axes of pivotal movement of the secondary frames;

transmission means mounted in the primary frame for drivingly interconnecting all of the primary axles;

drive means mounted in the primary frame and connected to the transmission means for cooperation therewith to drive all of the primary axles;

a plurality of secondary axles each individual to one of the secondary frames;

means for supporting each of the secondary axles on its secondary frame for rotation about an axis extending parallel to the axis of rotation of the primary axle individual thereto;

a plurality of secondary transmission means each for drivingly interconnecting one of the primary axles and the secondary axles individual thereto and each including a sprocket mounted on the primary axle within the secondary frame, a sprocket mounted on the secondary axle within the secondary frame and a drive chain enclosed within the secondary frame for drivingly interconnecting the two sprockets;

each of the secondary frames having a lever arm mounted thereon;

a plurality of lever arms mounted on the primary frame in alignment with the lever arms on the secondary frames;

a spring connected between the lever arm on each of the secondary frames and the corresponding lever arm on the primary frame;

a shock absorber connected between the lever arm on each of the secondary frames and the corresponding lever arm on the primary frame; and hydraulic cylinder means each connected at one end to each of the springs and to the associated shock absorber and each connected at the other end to the associated lever arm for selectively positioning the secondary axles of selected secondary frames substantially out of alignment with a plane extending tangent to at least two of the secondary axles and thereby facilitating skid steering, for selectively aligning all of the secondary axles and thereby facilitating high speed operation, and for vertically extending and retracting all of the wheel members relative to the primary frame to facilitate operation when loaded and unloaded and to vertically position the undercarriage with respect to an underlying surface.

14. The undercarriage according to claim 13 further including a wheel carried by each of the secondary axles and supported thereby adjacent the secondary frame which rotatably supports the secondary axis.

15. The undercarriage according to claim 1 wherein the springs of the spring and hydraulic cylinder assemblies are placed in tension between the secondary frames and the primary frame.

16. The undercarriage according to claim 15 wherein the spring and hydraulic cylinder assemblies each include a spring mounted in series with a hydraulic cylinder between each secondary frame and the primary frame.

17. The undercarriage according to claim 13 wherein the springs are placed in tension between the lever arm on each of the secondary frames and the corresponding lever arm of the primary frame.

18. The undercarriage according to claim 17 wherein each of the secondary frames extend the spring associated therewith as the secondary frame pivots upwardly toward the primary frame.

* * * * *